(12) United States Patent
Hasty et al.

(10) Patent No.: US 9,983,562 B2
(45) Date of Patent: May 29, 2018

(54) ADAPTIVE PART PROFILE CREATION VIA INDEPENDENT SIDE MEASUREMENT WITH ALIGNMENT FEATURES

(71) Applicant: ELECTRO SCIENTIFIC INDUSTRIES, INC., Portland, OR (US)

(72) Inventors: Joseph Matthew Hasty, Aloha, OR (US); Alexander Anatolievich Myachin, Beaverton, OR (US); Mark Theodore Kosmowski, Beaverton, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 258 days.

(21) Appl. No.: 14/962,732

(22) Filed: Dec. 8, 2015

(65) Prior Publication Data

US 2016/0187867 A1 Jun. 30, 2016

Related U.S. Application Data

(60) Provisional application No. 62/097,418, filed on Dec. 29, 2014.

(51) Int. Cl.
*G05B 19/25* (2006.01)
*G05B 15/02* (2006.01)
*G05B 19/401* (2006.01)

(52) U.S. Cl.
CPC .................. *G05B 19/401* (2013.01)

(58) Field of Classification Search
None
See application file for complete search history.

(56) References Cited

U.S. PATENT DOCUMENTS

| 4,319,270 | A | * | 3/1982 | Kimura | G01N 25/72 |
|---|---|---|---|---|---|
| | | | | | 250/559.46 |
| 5,027,137 | A | * | 6/1991 | Andoh | G03F 7/20 |
| | | | | | 396/548 |
| 5,751,585 | A | | 5/1998 | Cutler et al. | |
| 6,080,039 | A | * | 6/2000 | Bartlett | B23Q 11/08 |
| | | | | | 408/129 |
| 6,170,973 | B1 | * | 1/2001 | Benedict | G01N 21/8901 |
| | | | | | 348/E5.029 |
| 6,433,301 | B1 | | 8/2002 | Dunsky et al. | |
| 6,706,999 | B1 | | 3/2004 | Barrett et al. | |
| 7,019,891 | B2 | | 3/2006 | Johnson | |
| RE43,605 | E | | 8/2012 | O'Brien et al. | |
| 8,285,025 | B2 | | 10/2012 | Baldwin et al. | |

(Continued)

OTHER PUBLICATIONS

Written Opinion of PCT/US2015/064479, which corresponds with the subject U.S. Appl. No. 14/962,732, 9 pages, dated Mar. 23, 2016.*

(Continued)

*Primary Examiner* — Ramesh Patel

(57) ABSTRACT

Alignment features (60) associated with a support fixture (36) provide side scan data and top scan data reference points. Side scan displacement sensors (112) obtain side scan data of workpiece edge segments (23), and one or more cameras (130) obtain top scan data to provide a machining reference for the side scan data. The side scan data can be transformed into a top-view coordinate system usable by the laser machining system (140).

28 Claims, 12 Drawing Sheets

(56) References Cited

U.S. PATENT DOCUMENTS

| | | | |
|---|---|---|---|
| 2003/0047543 A1* | 3/2003 | Peng | B28D 1/221 219/121.68 |
| 2006/0057823 A1* | 3/2006 | Tiziani | G06K 19/041 438/463 |
| 2008/0198434 A1* | 8/2008 | Matsushita | B23K 26/0084 359/201.1 |
| 2009/0039060 A1* | 2/2009 | Palmquist | B23K 26/38 219/121.69 |
| 2011/0313269 A1* | 12/2011 | Kim | A61B 5/04001 600/373 |
| 2014/0083270 A1* | 3/2014 | Farnworth | B28D 5/0064 83/76.8 |
| 2014/0263212 A1* | 9/2014 | Zhang | B23K 26/082 219/121.69 |
| 2014/0340507 A1 | 11/2014 | Kim | |

OTHER PUBLICATIONS

International Search Report of PCT/US2015/064479, which corresponds with the subject U.S. Appl. No. 14/962,732, 2 pages, dated Mar. 23, 2016.

* cited by examiner

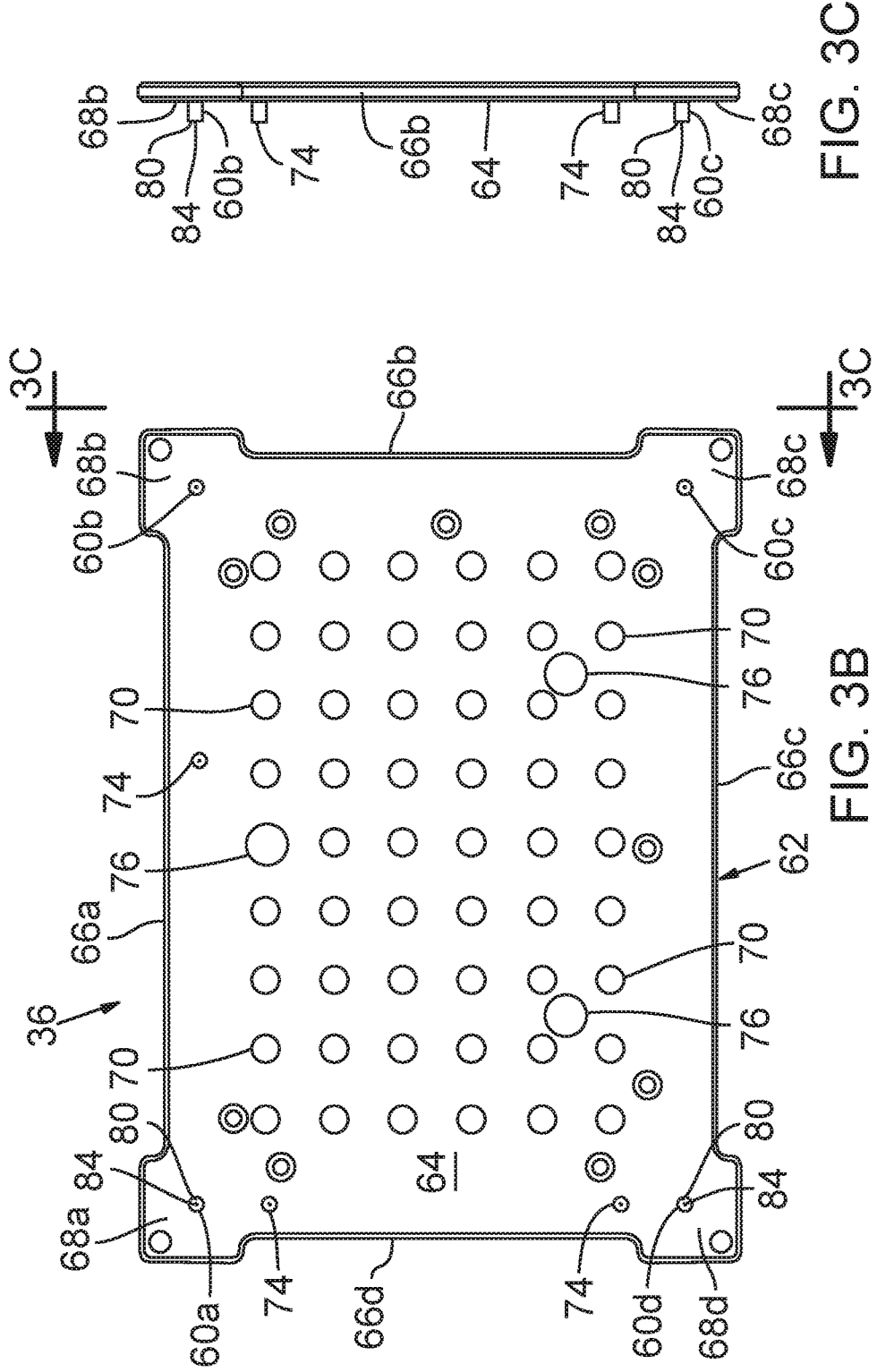

ADAPTIVE PART PROFILE CREATION VIA INDEPENDENT SIDE MEASUREMENT WITH ALIGNMENT FEATURES

CROSS REFERENCE TO RELATED APPLICATION

This application is a Non-Provisional application of U.S. Provisional Patent Application No. 62/097,418, which was filed on Dec. 29, 2014, the contents of which are herein incorporated by reference in their entirety for all purposes.

COPYRIGHT NOTICE

© 2015 Electro Scientific Industries, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This application relates to systems and methods for determining a position of a workpiece on a fixture with respect to a tool and, in particular, to systems and methods for determining a tool machining path over a surface of the workpiece on the fixture by inspection of a side of the fixture.

BACKGROUND

As electronic devices continue to decrease in size, tighter tolerances for coupling their structural components may be required to facilitate the smaller sizes or to protect internal electronic components from moisture or damage. In addition to the structural specifications for electronic devices, tighter tolerances for coupling the structural components is also driven by the cosmetic appearance of the electronic devices and the tactile sensations evoked by handling the electronic devices. As the marketplace for consumer electronics devices becomes more competitive, device manufacturers are seeking to make advances in the look and feel of their electronic devices as well in the technological capabilities of their electronic devices.

Moreover, during the manufacturing process, it is common for several components of a consumer electronic to be mated together such that the interacting features between mating surfaces is very small. As these interfaces continue to be driven to smaller and smaller dimensions, legacy inspection and positioning methods may not be adequate to provide the accuracy needed for tool machining applications.

SUMMARY

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

In some embodiments, wherein the workpiece has a workpiece top surface, wherein the workpiece has a workpiece bottom surface, wherein the workpiece has a workpiece side between the workpiece top surface and the workpiece bottom surface, wherein the workpiece has a workpiece edge positioned along the workpiece side, wherein the cover material has a cover top surface, wherein the cover material has a cover bottom surface, wherein the cover material has a cover side between the cover top surface and the cover bottom surface, wherein the cover material has an initial cover edge positioned at the cover side, wherein the workpiece top surface supports the cover material such that the cover bottom surface is closer to the workpiece top surface and the cover top surface is farther from the workpiece top surface, and wherein the initial cover edge is unmatched to the workpiece edge, a method for determining a customized tool path for machining a cover material to fit a workpiece employs: securing the workpiece to a support fixture, wherein the workpiece is secured in a stationary position with respect to the support fixture, wherein the workpiece bottom surface is closer to the support fixture and the workpiece top surface is farther from the support fixture, wherein the support fixture is associated with a plurality of alignment features, including a first alignment feature and a second alignment feature, wherein the first alignment feature has a first feature top dimension and a first feature side dimension, and wherein the second alignment feature has a second feature top dimension and a second feature side dimension; scanning the workpiece side, the first feature side, the second feature side, the first feature top, and the second feature top, wherein a side scan is employed to obtain side scan data, wherein a top scan is employed to obtain top scan data, wherein the side scan data includes workpiece edge profile data that is associated with characteristics of the workpiece edge, wherein the side scan includes side position data that is associated with relative side positions of the first feature side and the second feature side, wherein first feature top position data associated with the first feature top is obtained from the top scan, and wherein second feature top position data associated with the second feature top is obtained from the top scan; and determining a tool path, over the cover top surface of the cover material, that is associated with the workpiece edge, wherein the tool path is based on correlation of the side scan data with the top scan data.

In some alternative, additional, or cumulative embodiments, wherein the substrate has top and bottom surfaces and a side surface extending between the top and bottom surface, wherein the side surface corresponds to a substrate edge of the top surface of the substrate, and wherein the cover material has a cover top surface, a system for machining a cover material supported by a substrate of a workpiece comprises: a support fixture for supporting the substrate within a substrate support area of the support fixture; alignment features supported by the support fixture, the alignment features including first and second spaced-apart alignment features, wherein each alignment feature has a feature top and a feature side, wherein the feature top has a discernable top characteristic, and wherein the feature side has a discernable side characteristic; a first inspection system operable for acquiring top scan data; a second inspection system operable for acquiring side scan data; a relative movement system for causing relative movement between the support fixture and the first and second inspection systems; a machining tool operable for machining the cover material; and one or more processors for coordinating relative movement between the support fixture and the first and second inspection systems, for correlating the side scan data with the top scan data, for determining a tool path for the machining tool over the top surface of the cover material, and for coordinating operation of the machining tool with relative movement between the workpiece and the machining tool along the tool path.

In some additional or cumulative embodiments, a cutting tool axis of a machining tool is relatively aligned to a location on the cover top surface along the tool path; and the machining tool is employed to cut the cover top surface along the tool path associated with the workpiece edge to form a processed cover edge that matches the workpiece edge.

In some alternative, additional, or cumulative embodiments, wherein the workpiece has a workpiece top surface, wherein the workpiece has a workpiece bottom surface, wherein the workpiece has a workpiece side between the workpiece top surface and the workpiece bottom surface, wherein the workpiece has a workpiece edge positioned along the workpiece side, wherein the cover material has a cover top surface, wherein the cover material has a cover bottom surface, wherein the cover material has a cover side between the cover top surface and the cover bottom surface, wherein the cover material has an initial cover edge positioned at the cover side, wherein the workpiece top surface supports the cover material such that the cover bottom surface is closer to the workpiece top surface and the cover top surface is farther from the workpiece top surface, and wherein the initial cover edge is unmatched to the workpiece edge, a method for determining a customized tool path for machining a cover material to fit a workpiece: securing the workpiece to a support fixture, wherein the workpiece is secured in a stationary position with respect to the support fixture, wherein the workpiece support fixture has a fixture location calibrated with respect to a coordinate system for a machining tool, wherein the workpiece bottom surface is closer to the support fixture and the workpiece top surface is farther from the support fixture, wherein the support fixture is associated with a plurality of alignment features, including a first alignment feature and a second alignment feature, wherein the first alignment feature has a first feature side dimension, and wherein the second alignment feature has a second feature side dimension; scanning the workpiece side, the first feature side, and the second feature side, wherein a side scan is employed to obtain side scan data, wherein the side scan data includes workpiece edge profile data that is associated with characteristics of the workpiece edge, wherein the side scan includes side position data that is associated with relative side positions of the first feature side and the second feature side; determining a tool path, over the cover top surface of the cover material, that is associated with the workpiece edge, wherein the tool path is based on correlation of the side scan data with the fixture location calibrated with respect to the coordinate system for the machining tool; relatively aligning a cutting tool axis of a machining tool to a location on the cover top surface along the tool path; and employing the machining tool to cut the cover top surface along the tool path associated with the workpiece edge to form a processed cover edge that matches the workpiece edge.

In some alternative, additional, or cumulative embodiments, the first and second alignment features are respective alignment pins.

In some alternative, additional, or cumulative embodiments, the machining tool is a laser.

In some alternative, additional, or cumulative embodiments, the workpiece edge forms a workpiece perimeter, the initial cover edge forms an initial cover edge perimeter, and the processed cover edge forms a processed cover perimeter.

In some alternative, additional, or cumulative embodiments, the workpiece edge includes a plurality of transverse workpiece edge segments, and the initial cover edge includes a plurality of transverse initial cover edge segments.

In some alternative, additional, or cumulative embodiments, the workpiece is loaded into a random position with respect to the support fixture, and the first alignment feature and the second alignment feature are external to the workpiece perimeter.

In some alternative, additional, or cumulative embodiments, the workpiece is secured to the support fixture by vacuum pressure.

In some alternative, additional, or cumulative embodiments, the support fixture has a major surface dimension that is greater than that of the workpiece.

In some alternative, additional, or cumulative embodiments, the support fixture has a fixture surface area that prevents employment of a machining axis having perpendicular intersection with the cover bottom surface along the workpiece edge.

In some alternative, additional, or cumulative embodiments, the first alignment feature and the second alignment feature provide a static reference to the workpiece when it is secured to the support fixture.

In some alternative, additional, or cumulative embodiments, a predetermined feature separation distance is employed to scale the relative side positions of the first feature side and the second feature side.

In some alternative, additional, or cumulative embodiments, the workpiece top surface has opposing workpiece edge segments separated by a workpiece edge separation distance, and a separation distance between the first and second alignment features is longer than the workpiece edge separation distance.

In some alternative, additional, or cumulative embodiments, one or more displacement sensors can be employed to obtain the side scan data.

In some alternative, additional, or cumulative embodiments, the step of scanning includes mapping.

In some alternative, additional, or cumulative embodiments, a sufficient number of additional alignment features are employed such that each workpiece edge segment fits between two alignment features.

In some alternative, additional, or cumulative embodiments, the first alignment feature and the second alignment feature are positioned along a feature line, and the workpiece edge is positioned nonparallel to the feature line.

In some alternative, additional, or cumulative embodiments, the first alignment feature has a first feature diameter, the second alignment feature has a second feature diameter, and the first feature diameter and the second feature diameter are different.

In some alternative, additional, or cumulative embodiments, the first alignment feature has a first feature diameter, the second alignment feature has a second feature diameter, and the first feature diameter and the second feature diameter are equal.

In some alternative, additional, or cumulative embodiments, the workpiece edge has a workpiece length that is approximate to a predetermined workpiece length.

In some alternative, additional, or cumulative embodiments, any cover portion of the processed cover edge is within 100 microns of a respective nearest workpiece portion of the workpiece edge.

In some alternative, additional, or cumulative embodiments, any cover portion of the processed cover edge is within 50 microns of a respective nearest workpiece portion of the workpiece edge.

In some alternative, additional, or cumulative embodiments, any cover portion of the processed cover edge is within 25 microns of a respective nearest workpiece portion of the workpiece edge.

In some alternative, additional, or cumulative embodiments, any gap between the cover perimeter and the workpiece perimeter appears uniform to an unaided human eye of average vision at a distance of greater than or equal to 25 mm from the human eye.

In some alternative, additional, or cumulative embodiments, the workpiece edge is longer than 50 mm.

In some alternative, additional, or cumulative embodiments, the workpiece edge is longer than 375 mm.

In some alternative, additional, or cumulative embodiments, the cover material comprises an optically opaque material.

In some alternative, additional, or cumulative embodiments, the cover material comprises a plastic material.

In some alternative, additional, or cumulative embodiments, the cover material comprises a ceramic material.

In some alternative, additional, or cumulative embodiments, the top surface of the cover material is devoid of alignment features.

In some alternative, additional, or cumulative embodiments, the first alignment feature has a first feature top surface including a first alignment fiducial, the second alignment feature has a second feature top surface including a second alignment fiducial, and the first and second alignment fiducials have fiducial major dimensions that are smaller than respective alignment feature major dimensions.

In some alternative, additional, or cumulative embodiments, the first alignment fiducial is centered on the first feature top surface, and the second alignment fiducial is centered on the second feature top surface.

In some alternative, additional, or cumulative embodiments, the characteristics of the edge profile data include the distance between a side scan sensor and each of a multiplicity of points along the workpiece side as each of the points passes through a side sensor axis of the side sensor.

In some alternative, additional, or cumulative embodiments, the side scan data include the relative distances between alignment features and corners of the edge segments.

In some alternative, additional, or cumulative embodiments, multiple support fixtures each have first and second alignment features that are respectively mapped relative to each other to provide respective support feature data specific to each support fixture.

In some alternative, additional, or cumulative embodiments, the support feature data is used to transform the side scan data into a coordinate system employed by a machining tool.

In some additional or cumulative embodiments, the step of scanning comprises scanning the entire workpiece perimeter.

In some additional or cumulative embodiments, the side scan is performed by a side scan sensor, the top scan is performed by a top scan sensor, and the side scan sensor and the top scan sensor are different types of sensors.

In some alternative, additional, or cumulative embodiments, the workpiece includes opposing first and second edge segments, a first side scan sensor scans the first edge segment, and the second side scan sensor scans the second edge segment.

In some alternative, additional, or cumulative embodiments, the step of scanning further comprises employing one or more stationary sensors to scan a moving the workpiece.

In some alternative, additional, or cumulative embodiments, the step of scanning further comprises moving one or more sensors along a workpiece.

In some alternative, additional, or cumulative embodiments, side scan data acquisition is synchronized with relative position between a scan sensor and locations along the workpiece side by use of a linear or positional encoder.

In some alternative, additional, or cumulative embodiments, side scan data acquisition employs a predetermined sampling rate synchronized with a substantially constant velocity of relative movement between a scan sensor and locations along the workpiece side.

In some additional or cumulative embodiments, side scan data acquisition utilizes a known distance between the first alignment feature and the second alignment feature and employs a substantially constant velocity of relative movement between a scan sensor and locations along the workpiece side.

In some alternative, additional, or cumulative embodiments, the substantially constant velocity is maintained within 5% of a predetermined velocity.

In some alternative, additional, or cumulative embodiments, the machining tool comprises a computer-controlled cutting machine.

In some alternative, additional, or cumulative embodiments, one or more obstructions are positioned between the workpiece side and a sensor for acquiring side scan data, and characteristics of workpiece edge portions occluded by the one or more obstructions are extrapolated from the side scan data.

In some alternative, additional, or cumulative embodiments, one or more obstructions are positioned between the workpiece side and a sensor for acquiring side scan data, and characteristics of workpiece edge portions occluded by the one or more obstructions are interpolated from the side scan data.

In some alternative, additional, or cumulative embodiments, the workpiece edge forms a workpiece perimeter having a workpiece edge profile, and wherein the side scan data is used to compare the workpiece edge profile to a predetermined ideal edge profile for the workpiece perimeter.

In some alternative, additional, or cumulative embodiments, the side scan occurs in a side scan field, and the tool path is implemented in a machining field that is discrete from the side scan field.

In some alternative, additional, or cumulative embodiments, the side scan field is physically separated from the machining field.

In some alternative, additional, or cumulative embodiments, the workpiece is maintained in a single position with respect to the support fixture through the scanning step and a machining step.

In some alternative, additional, or cumulative embodiments, a first pair of side scan sensors simultaneously obtain side scan data from respective first and second opposing workpiece edge segments, and a second pair of side scan sensors simultaneously obtain side scan data from respective third and fourth opposing workpiece edge segments.

In some alternative, additional, or cumulative embodiments, the first pair of side scan sensors have scanning axes that are transversely oriented to scanning axes of the second pair of side scan sensors.

In some alternative, additional, or cumulative embodiments, one of the first and second pairs of side scan sensors are stationary during the step of scanning, and one of the first and second pairs of side scan sensors are in motion during the step of scanning.

In some alternative, additional, or cumulative embodiments, the first pair of side scan sensors obtains side scan data before the second pair of side scan sensors obtains side scan data.

In some alternative, additional, or cumulative embodiments, the side scan data is obtained before the top scan data is obtained.

In some alternative, additional, or cumulative embodiments, a first workpiece edge segment is positioned between axes defined by the first and second alignment features, a second workpiece edge segment is positioned between axes defined by the second alignment feature and a third alignment feature, and data associated with the second alignment feature is used to provide a continuous tool path along the first workpiece edge and the second workpiece edge.

Additional aspects and advantages will be apparent from the following detailed description of exemplary embodiments, which proceeds with reference to the accompanying drawings.

BRIEF DESCRIPTION OF THE DRAWINGS

FIG. 3B is top plan view of the exemplary embodiment of a support fixture employing a plurality of alignment features shown in FIG. 3A.

FIG. 3C is rear side view of the exemplary embodiment of a support fixture (taken along lines 3C of FIG. 3B) employing a plurality of alignment features shown in FIG. 3A.

DETAILED DESCRIPTION OF EXEMPLARY EMBODIMENTS

Figure 1:
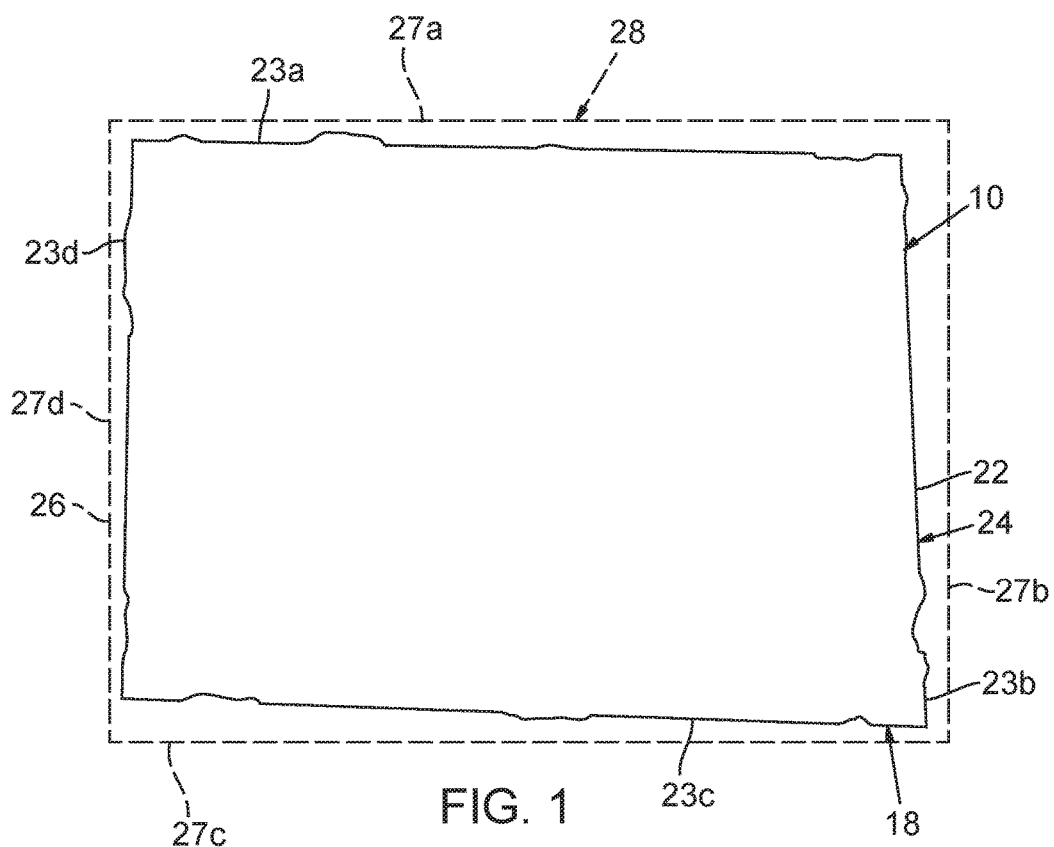
FIG. 1 is a top plan view of a generic workpiece.

Example embodiments are described below with reference to the accompanying drawings. Many different forms and embodiments are possible without deviating from the spirit and teachings of this disclosure and so this disclosure should not be construed as limited to the example embodiments set forth herein. Rather, these example embodiments are provided so that this disclosure will be thorough and complete, and will convey the scope of the disclosure to those skilled in the art. In the drawings, the sizes and relative sizes of components may be disproportionate and/or exaggerated for clarity. The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween.

FIG. 1 is a top plan view of a generic workpiece 10, such as a housing for an electronic device. The workpiece 10 may include a substrate 12 with or without a plurality of layers, materials, or components. With reference to FIG. 1, manufacturing processes can cause deviation of an edge 22 in a workpiece perimeter 18 of the workpiece 10 such that workpiece perimeter profiles 24 of any two of the workpieces 10 may be different. For convenience, the workpiece edge 22 may be considered to include one or more workpiece edge segments 23, 23a, 23b, 23c, and 23d (which may also be referred to as edge segments 23 or edges 22).

FIG. 1 shows in dashed lines an ideal edge 26 of the workpiece 10 as if it had an ideal workpiece perimeter profile 28, such as a perfect rectangle. For convenience, the ideal workpiece edge 26 may be considered to include one or more ideal workpiece edge segments 27a, 27b, 27c, and 27d (which may also be referred to as ideal edge segments 27 or ideal edges 26). Also for convenience, the actual workpiece edge 22 is shown in solid lines and is overlayed by the ideal workpiece perimeter profile 28. The actual workpiece edge 22 is depicted with exaggerated deviations so that the deviations are readily discernable from the ideal workpiece perimeter profile 28.

Figure 2:
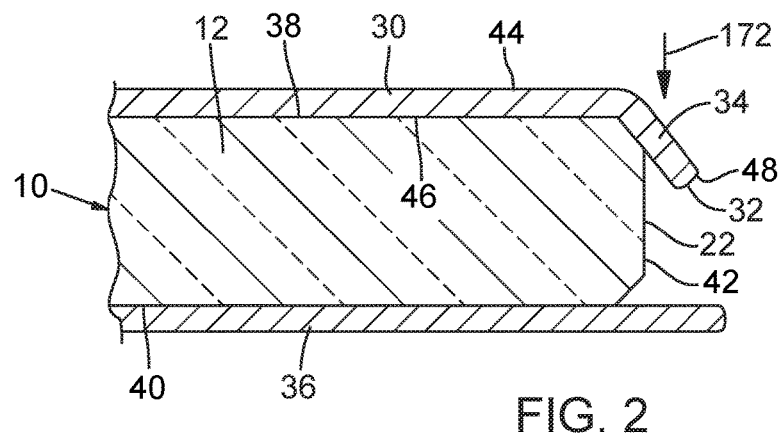
FIG. 2 is a cross-sectional side view of the workpiece as covered by an oversized piece of cover material.

In some manufacturing processes, it is desirable to cover the workpiece 10 with a protective or decorative layer of a cover material 30. FIG. 2 is a cross-sectional side view of the workpiece 10, shown supported by a support fixture 36 and covered by an oversized piece of the cover material 30. With reference again to FIG. 2, the workpiece has a workpiece top surface 38 and a workpiece bottom surface 40 with a workpiece side 42 between the workpiece top surface 38 and the workpiece bottom surface 40. The workpiece edge 22 is positioned along the workpiece side 42.

The cover material 30 has a cover top surface 44 and a cover bottom surface 46 with a cover side 48 or cover edge segment 32 between the cover top surface 44 and the cover bottom surface 46. The workpiece top surface 38 supports the cover material 30 such that the cover bottom surface 46 is closer to the workpiece top surface 38 and the cover top surface 44 is farther from the workpiece top surface 38.

With reference again to FIG. 2, the oversized piece of the cover material 30 may be sized and positioned so that it overlaps and extends beyond the edge 22 of the workpiece 10 (and thus overlaps and extends beyond one or more of the edge segments 23 of the workpiece 10). In some embodiments, the oversized piece of the cover material 30 may be sized and positioned so that it overlaps and extends beyond all of the edge segments 23 of the workpiece 10. A person skilled in the art will appreciate that the oversized piece of the cover material 30 may have a size and an initial cover perimeter profile that deviates from an ideal cover perimeter profile, wherein an ideal cover perimeter profile would closely match the actual workpiece perimeter profile 18.

Moreover, the oversized piece of the cover material 30 may not be perfectly positioned such that its cover edge segments 32 are equidistant from the respective workpiece edge segments 23. In particular, some of the cover edge segments 32 of the oversized piece of the cover material 30 may extend father from the respective edge segments 23 of the workpiece 10 than do other edge segments 23. Additionally or alternatively, the cover edge segments 32 of the oversized piece of the cover material 30 may be askew with respect to the edge segments 23 of the workpiece 10 such that different sections of one cover edge segment 32 of the oversized piece of the cover material 30 are at different distances from respective sections of one edge segment 23 of the workpiece 10.

In some manufacturing processes, process engineers have determined that it would be desirable to trim an overhang 34 of the oversized piece of the cover material 30 so that the edge segments 32 of the cover material 30 are within a gap distance of a specific range of distances from the respective edge segments 23 of the workpiece 10. The gap distance may indicate a cover edge segment 32 that extends externally beyond the workpiece edge segment 23, or the gap distance may indicate that the cover edge segment 32 is internal to the workpiece edge segment 23. In some embodiments, it may be desirable that the cover edge segment 32 is internal to the workpiece edge segment 23 to prevent the cover material 30 from catching fabric of an end user's clothing or catching an end user's finger, for example. Moreover, it would be desirable to trim or cut the cover material 30 so that every point along the cover edge segments 32 is equidistant from respective points along the workpiece edge segments 23. A uniform gap distance may offer a preferable cosmetic appearance.

In some embodiments, the range of distance between points along the cover edge segments and respective points along the workpiece edge segments 23 is from zero to 3 mm, where a gap distance of zero means that a processed edge segment 32 of the cover material 30 is flush with the respective edge segment 23 of the workpiece 10. In some embodiments, the gap distance is from zero to 2 mm. In some embodiments, the gap distance is from zero to 1 mm. In some embodiments, the gap distance is from zero to 500 µm. In some embodiments, the gap distance is from zero to 250 µm.

In some embodiments, the range of distance between points along the cover edge segments and respective points along the workpiece edge segments 23 is from zero to 100 µm, where a gap distance of zero means that a processed edge segment 32 of the cover material 30 is flush with the respective edge segment 23 of the workpiece 10. In some embodiments, the gap distance is from zero to 75 µm. In some embodiments, the gap distance is from zero to 50 µm. In some embodiments, the cover edge segments 32 are trimmed to be flush with the respective edge segments 23. In some embodiments, the gap distance is from 5 to 100 µm. In some embodiments, the gap distance is from 5 to 75 µm. In some embodiments, the gap distance is from 5 to 50 µm. In some embodiments, the gap distance is from 10 to 100 µm. In some embodiments, the gap distance is from 10 to 75 µm. In some embodiments, the gap distance is from 10 to 50 µm. In some embodiments, the gap distance may be greater than 100 µm. In some additional, selectively additive, or cumulative embodiments, the differential distances between all of the respective cover edge segments 32 and workpiece edge segments 23 are the same. In some additional, selectively additive, or cumulative embodiments, the differential distances between the respective edges 32 and workpiece edge segments 23 may be different.

Workpiece inspection and tool path generation is conventionally addressed by inspection of a workpiece and alignment features by a camera directed toward the top surface 38 of the workpiece 10. Many conventional laser-machining systems have this capability, including the ESI model 5900cs system manufactured by Electro Scientific Industries, Inc. of Portland, Oreg. In particular, cameras and image pattern recognition can identify a workpiece edge profile in relation to alignment features to create a tool path adapted for an individually scanned workpiece 10.

However, many embodiments of the workpieces 10 and the trimming precision disclosed herein provide a number of circumstances that may preclude standard inspection and tool path generation techniques for a number of reasons. Features of different size and type on the edge 22 of a workpiece 10 evoke different expansion rates of a certain types of cover materials 30, such as plastic materials, as they are molded into a desired shape. As noted earlier, the specification for the distance between the edge segments 32 of the cover material 30 and the edge segments 23 of the workpiece 10 may be on the micron level and generally not farther than tens of microns away from each other around the entire workpiece 10. The applicant has determined that an adaptive cut to achieve a desirable gap distance between the cover edge 32 and the workpiece edge 22 may be desirable. Applicant has also determined that it would be desirable to individually inspect each workpiece 10 and adapt an individually customized trimming profile (and machining tool path) for each workpiece 10. Applicant has also determined that cutting the cover material 30 from the cover bottom surface 46 could damage the side 42 of the workpiece 10, so cutting the cover material from the top surface 44 is preferable.

In many embodiments, the top surface 44 of the cover material 30 is cosmetic and has no defining features to provide positional information with suitable accuracy and contrast to meet machining and edge specifications. Moreover, in many embodiments, the cover material is opaque and does not permit inspection of the workpiece edge 22 through the top surface 44 of the cover material 30. Thus, inspecting and measuring the cover material 30 from its top surface 44 to determine the workpiece perimeter profile 24 is generally infeasible for such embodiments.

Although it may be possible to inspect the workpiece edge 22 from the bottom surface 40 of the workpiece 10 to create a tool path adapted to the specific workpiece edge 22, maintaining registration to alignment features when flipping the workpiece 10 can be problematic and not practical (for acceptable throughput and other reasons) during commercial production. Additionally, a clear line-of-sight to the workpiece edge 22 would facilitate camera inspection methods. A support fixture that permits a clear line-of-sight of the workpiece edge 22 from the workpiece bottom surface 40, while still providing correct workpiece registration and alignment for some embodiments, presents many design and manufacturing challenges.

For some embodiments of the workpiece 10, applicant has determined that a separate side-oriented scanning system for obtaining edge scan data and a top-oriented machining alignment system for machining the workpiece edge 22 can achieve the desired trim specifications, especially if a coordinate reference frame is provided between the side-oriented scanning system and the top-oriented machining alignment system. For some embodiments, one or more alignment features 60, such as alignment pins, are employed to provide the coordinate frame of reference between the side-oriented scanning system and the top-oriented machining alignment system to facilitate accurate and precise trimming of the overhang 34 to match the workpiece edge 22.

Figure 3A:
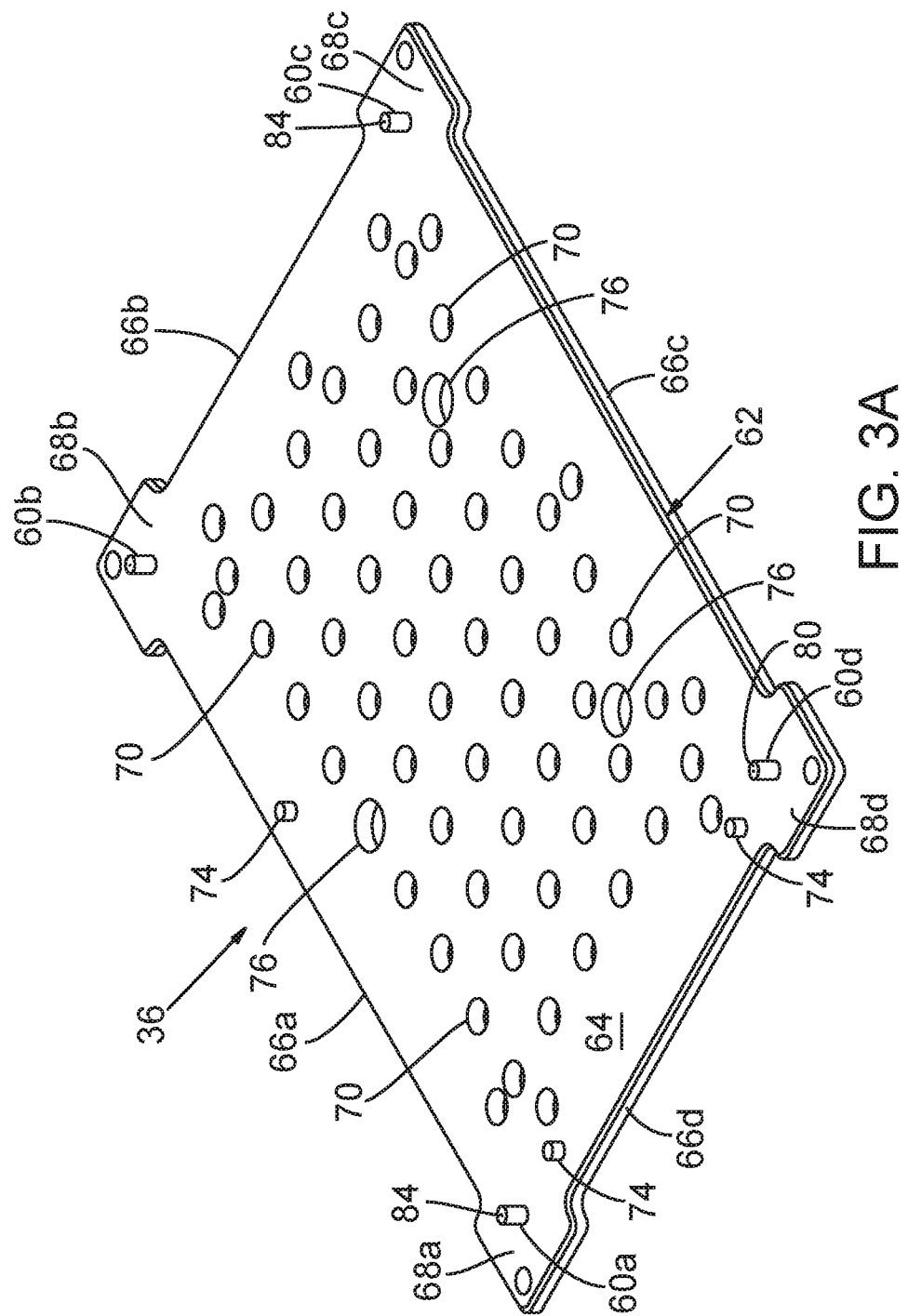
FIG. 3A is a front and right isometric view of an exemplary embodiment of a support fixture employing a plurality of alignment features.

FIGS. 3A-3C present front and right isometric, top plan, and rear side views of an exemplary embodiment of a support fixture 36 employing a plurality of workpiece alignment features 60a, 60b, 60c, and 60d (generically or collectively alignment features 60) to provide the coordinate frame of reference between the side-oriented scanning system and the top-oriented machining alignment system. In many embodiments, the support fixture 36 has larger dimensions than those of the workpiece 10. In particular, the support fixture 36 may have a fixture perimeter 62 that is greater than the workpiece perimeter 18, and the fixture perimeter 62 may define a fixture top surface 64 having a surface area that is greater than a surface area of the workpiece top surface 38. Moreover, each fixture edge segment 66 (such as fixture edge segments 66a, 66b, 66c, and 66d) may have a fixture edge segment length that is longer than that of the corresponding workpiece segment 23.

The support fixture 36 need not have any particular shape. For example, the support fixture may be generally rectangular, such as shown in FIG. 3A, or generally square, circular, elliptical, oval, hexagonal, or octagonal. Moreover, the support fixture 36 may include one or more fixture frame features 68a, 68b, 68c, and 68d (collectively or generically fixture frame features 68) may extend externally beyond or form depression internally to the general shape of the support fixture 36. The frame features 68 may be useful for handling, transport, or alignment of the support fixture 36. The support fixture 36 may also include additional frame alignment features such as fixture pins 74 and fixture holes 76. In some embodiments, each support feature 36 includes a unique barcode or other machine readable identifier to provide a means of identification for process traceability.

Figure 3D:
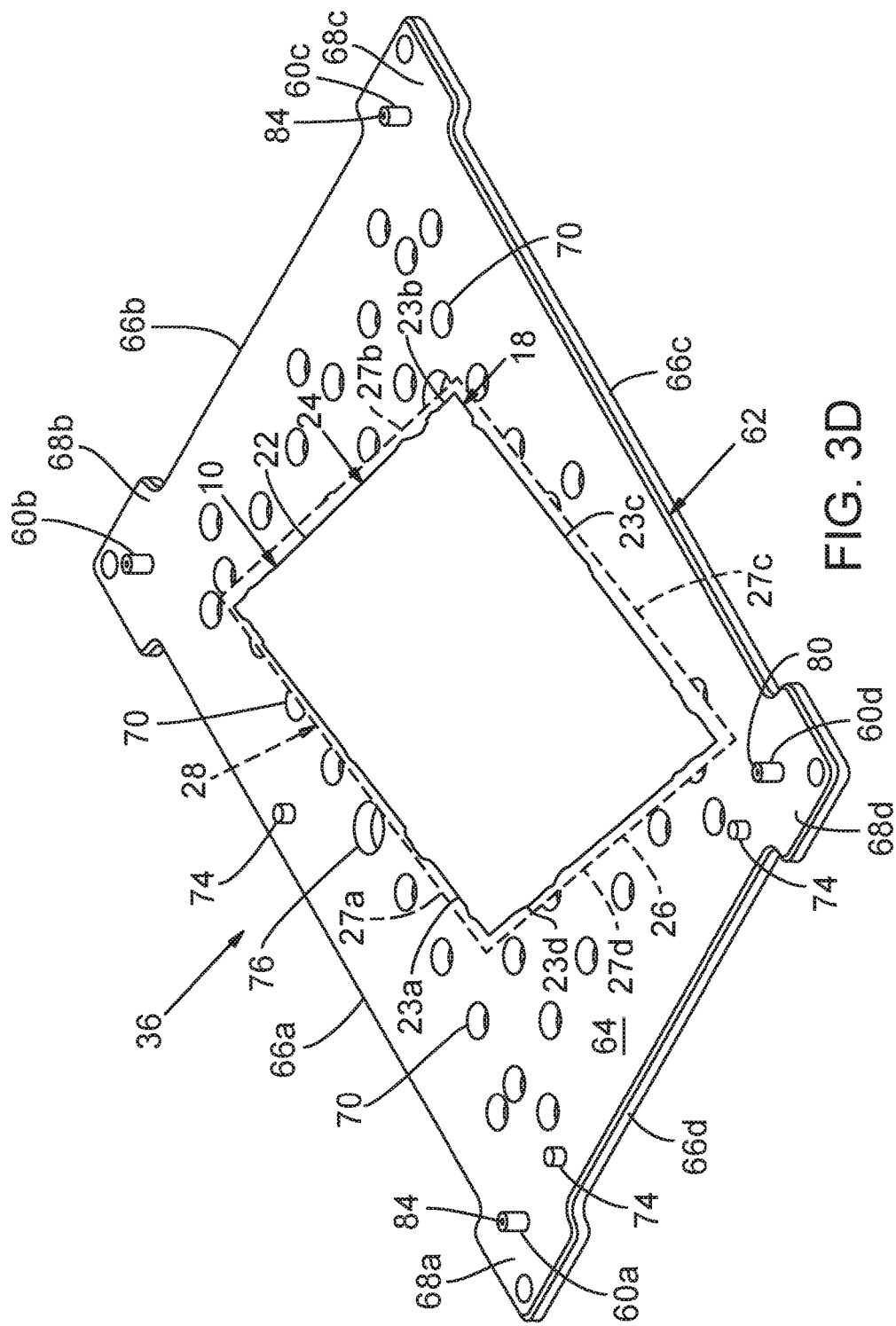
FIG. 3D is a front and right isometric view of an exemplary embodiment of the support fixture of FIG. 3A supporting a workpiece in an askew orientation.
Figure 4A:
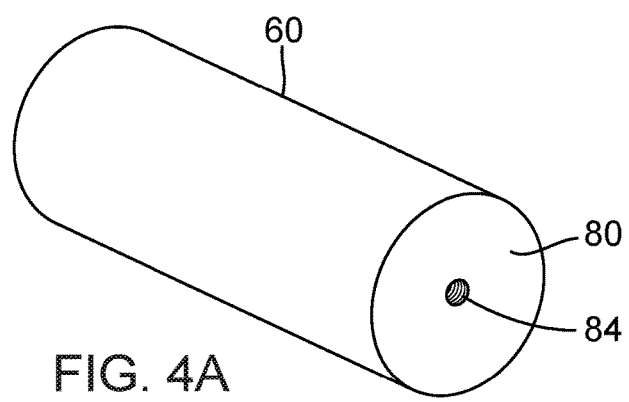
FIGS. 4A, 4B, and 4C are a respective side and top isometric view, a top plan view, and a side view of an exemplary alignment pin suitable for use with the exemplary support fixtures depicted in FIGS. 3A, 3B, and 3C.
Figure 4C:
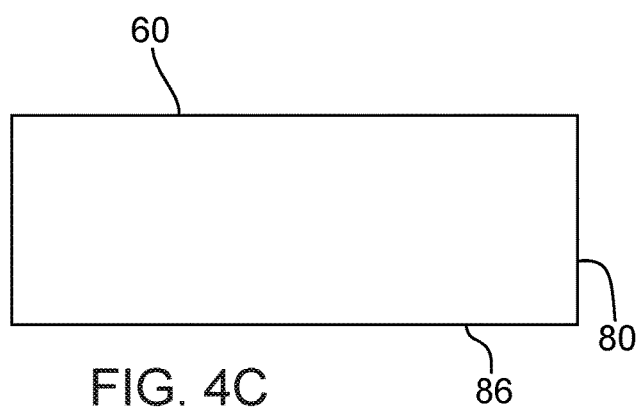
Figure 4B:
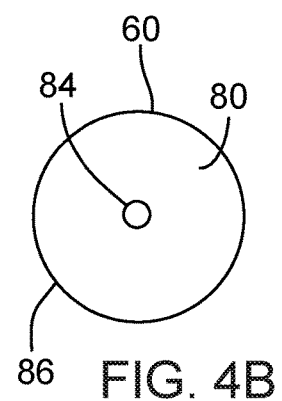

In many embodiments, the support fixture 36 can be adapted for securing a workpiece 10 in a stationary position with respect to the support fixture 36. FIG. 3D is a front and right isometric view of an exemplary embodiment of the support fixture 36 supporting a workpiece 10 in an askew orientation.

In some embodiments, the workpiece securing mechanism includes a plurality of vacuum holes 70 connected directly or indirectly to a vacuum source (not shown), such as through a quick-connect vacuum umbilical. The vacuum holes 70 can be evenly distributed in an array of rows and columns over the fixture surface 64, or the vacuum holes 70 can be evenly distributed in any non-columnar arrangement. However, the vacuum holes 70 do not need to be evenly distributed, nor do the vacuum holes 70 need to have uniform shapes or sizes. Moreover, the vacuum holes 70 can be circular or have any other shape. Alternative securing mechanisms can additionally or alternatively employ guide and retention rails (not shown), clamps (not shown), and a recess (not shown) in the fixture surface 64 sized and adapted to hold the workpiece 10.

With reference again to FIG. 3A, in some embodiments, the alignment features 60 are attached to the fixture surface 64 of the support fixture 36. In some embodiments, the alignment features 60 are attached to or positioned along the fixture edge segments 66. In some embodiments, the alignment features 60 may protrude through holes (not shown) in the support fixture 36 and may form part of a chuck, stage, or conveyor adapted to move and position the support fixture 36. In some embodiment, the support fixture 36 itself forms part of a chuck, stage, or conveyor.

The alignment features 60 may be positioned at any location on the fixture surface 64 or along the fixture edge segments 66. In some embodiments, the alignment features 60 are positioned externally to the workpiece 10. The fixture surface 64 typically has a specimen area of sufficient size to support the entire workpiece 10, and the alignment features 60 can be positioned externally to the specimen area. In some embodiments, the alignment features 60 can be positioned externally to the area utilized by the securing mechanism, such as externally to the area of the fixture surface utilized by the vacuum holes 70. In some preferred embodiments, the alignment features 60 lie outside of the full bounds of the workpiece 10 such that, when scanned from a side scan view (edge-on), the alignment features 60 are distinguishable from the workpiece edge 22 within the data obtained by the side scan system. In some additional or alternative embodiments, the alignment features 60 can be positioned within or connected to the fixture frame features 68, such as shown in FIG. 3A.

In some alternative or additional embodiments, the alignment features 60 can be positioned external to one or more of the intersections of the workpiece edge segments 23. In some alternative or additional embodiments, the support fixture 36 is associated with one alignment feature 60 each of the intersections of the workpiece edge segments 23. In some embodiments, the support fixture 36 can be associated with more alignment features 60 than the number of the intersections of the workpiece edge segments 23. In some embodiments, the support fixture 36 can be associated with fewer alignment features 60 than the number of the intersections of the workpiece edge segments 23.

In some embodiments, the support fixture 36 supports two sets of two or more alignment features 60 that are equally spaced apart. In some embodiments, the support fixture 36 is associated with four alignment features 60 positioned at corners defining rectangle on the fixture surface 64 of the support fixture 36. In some embodiments, the alignments features 60 are aligned along lines that are parallel to portions of the fixture edge segments 66. However, the spacing between alignment features 60 need not be equal, nor do the alignment features need to be aligned with respect to the fixture edge segments 66.

In some embodiments, two of the alignment features have center-to-center spacing within a range of 200000 μm to 210000 μm (such as in the X axis) within an accuracy of about 10 µm. In some embodiments, two of the alignment features have center-to-center spacing within a range of 140000 µm to 142000 µm (such as in the Y axis) within an accuracy of about 10 µm. In some embodiments, the center-to-center spacing has an accuracy within about 1 µm.

The alignment features 60 are generally three-dimensional to provide the coordinate frame of reference between the side-oriented scanning system and the top-oriented machining alignment system. The alignment features can have a variety of shapes. Exemplary shapes include, but are not limited to, cylinder (such as a right circular cylinder, but the cross-section may be elliptical or other shape), cone, pyramid (such as having a rectangular, square, triangular, or polyhedral base including but not limited to hexagonal or octagonal), cuboidal, or polyhedral prismatic (such as pentagonal prismatic, hexagonal prismatic, and octagonal prismatic). For some embodiments, a right circular cylinder is preferred.

In many embodiments, the alignment features 60 each have a flat top feature surface 80. The flat top feature surface 80 may be parallel to the fixture surface 64. In some embodiments, the alignment features 60 have known side view dimensions and known top view dimensions. In many embodiments, each of the alignment features 60 has the same side view dimension, and each of the alignment features 60 has the same top view dimension. In many embodiments, each alignment feature 60 has a side view dimension that equal a top view dimension. However, the separate alignment features 60 need not all have equal dimensions. For example, a first two alignment features 60*a* and 60*b* may share the same dimensions, while a second two alignment features 60*c* and 60*d* may share the same dimensions that are different from those of the first two alignment features 60*a* and 60*b*. In some examples, the side view and top view dimensions are the same as the diameter of a cylindrical alignment feature 60. In other examples, the side view and top view dimensions are the same as one of the lengths of a rectangular prismatic alignment feature 60.

In some embodiments, the alignment features 60 have a diameter or top surface major axis of less than or equal to 5 mm. In some embodiments, the diameter or top surface major axis of the alignment feature 60 is less than or equal to 4 mm. In some embodiments, the diameter or top surface major axis of the alignment feature 60 is less than or equal to 2 mm. In some embodiments, the diameter or top surface major axis of the alignment feature 60 is less than or equal to 1 mm.

In some embodiments, the diameter or top surface major axis of the alignment feature 60 has an accuracy of within +/−5 µm. In some embodiments, the diameter or top surface major axis of the alignment feature 60 has an accuracy of within +/−3 µm. In some embodiments, the diameter or top surface major axis of the alignment feature 60 has an accuracy of within +/−1 µm.

In some embodiments, the alignment features 60 have a height with respect to the fixture surface 64 of the support fixture 36 that will be about equal to the focal plane of a laser used for cutting the cover material 30. Should alignment and laser focal plane heights not match there are a couple of methods to accommodate such a discrepancy. In some embodiments, the z-height can be adjustable for both laser and camera to accommodate workpieces 10 having different heights. A calibration may be necessary to compensate for discrepancy between laser and camera via a simple offset. For example, the system can identify where the laser is in focus relative to a z-height encoder reference and identify where the alignment camera is in focus relative to the same reference. When switching between the laser and the camera, the z-stage can move to the appropriate focus z-height for either effector.

In some embodiments, where the laser plane is in focus and the alignment feature is not: if accuracy is not critical (some additional positional error for the cut is allowable) and the alignment feature is still discernable/identifiable via the alignment method (camera) but not quite in focus, then the mismatch in z-height may be acceptable; if the z-height discrepancy is known a priori, then calibrations can be employed to ensure laser cut positional accuracy outside of the focal plane. However, laser cut quality could suffer should the laser not be in focus (width [kerf] of cut likely to be larger).

In some embodiments, the alignment features 60 have a height with respect to the fixture surface 64 of the support fixture 36 that will be taller than the top surface 44 of the cover material 30. In some embodiments, the alignment features 60 have a height with respect to the fixture surface 64 of the support fixture 36 that will be shorter than the top surface 44 of the cover material 30.

In some embodiments, one or more of the alignment features 60 present a top fiducial to a top scan view. In some embodiments, each of the alignment features 60 presents a top fiducial 84 to the top scan view. In some embodiments, one or more of the alignment features 60 present a side fiducial (not shown) to a side scan view. In some embodiments, each of the alignment features 60 presents a side fiducial to the side scan view. In some embodiments, the top fiducial 84 is (vertically) aligned with the side scan fiducial. In some embodiments, top fiducials 84 are not employed. In some embodiments, side fiducials are not employed. In some embodiments, top fiducials 84 are employed and side fiducials are not employed. In some embodiments, top fiducials 84 are not employed and side fiducials are employed.

In many embodiments, the fiducials are centrally positioned on the respective surface or surfaces. For example, the top fiducial 84 can be centered with respect to the top feature surface 80. For example, if the alignment feature 60 is a cylinder, the top fiducial 84 can be positioned at the center of the circle of the top feature surface 80. For example, if the alignment feature 60 is a square prism, the top fiducial 84 can be positioned at the intersection of diagonals from the corners of the top feature surface 80. The side fiducial may be centered with respect to feature edges 86 as viewed from a side scan view, such as shown in FIG. 3C. In some embodiments, the fiducial may be a surface or engraved mark such a point, a cross, or an "x." In some embodiments, the fiducial may be a hole drilled completely or part way through the alignment feature 60. While centering is preferred for most embodiments, the fiducials need not be centered. In some embodiments, such as for pyramids and cones, wherein the top scan view sees a central point surrounded by a base, the central point may function as a fiducial and one side of the base may function as the fiducial edge 86.

In some embodiments, the top fiducial 84 has a dimension that is less than or equal to 15% of the diameter or major axis of the top surface 80 of the alignment feature 60. In some embodiments, the top fiducial 84 has a dimension that is less than or equal to 10% of the diameter or major axis of the top surface 80 of the alignment feature 60.

In some embodiments, the top fiducial 84 has a dimension of less than or equal to 1 mm. In some embodiments, the top fiducial 84 has a dimension of less than or equal to 750 µm. In some embodiments, the top fiducial 84 has a dimension of less than or equal to 500 µm.

Figure 5:
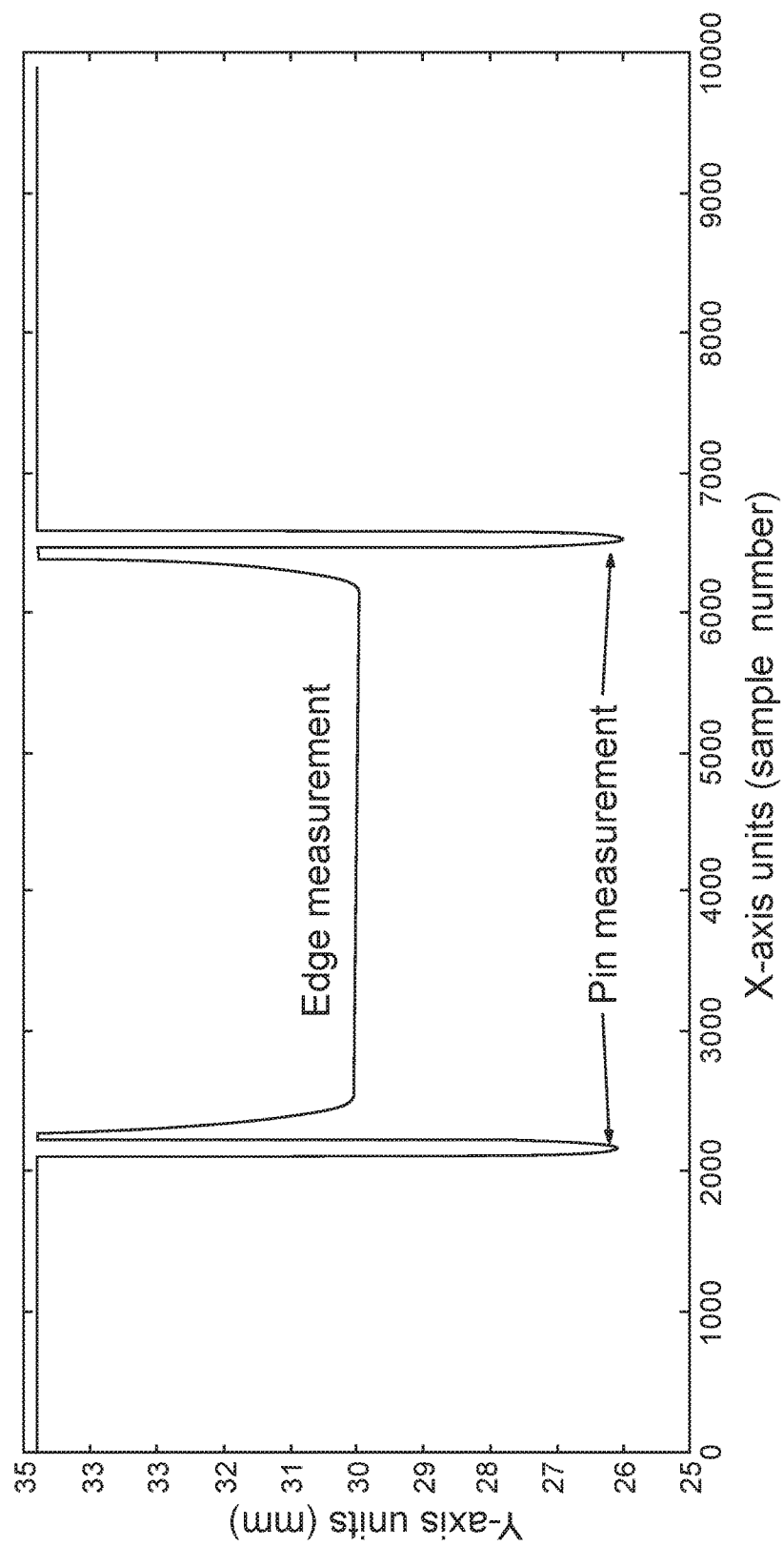
FIG. 5 is a graphical depiction of exemplary side scan data, showing relative positions of two exemplary alignment features with respect to corners of a workpiece edge segment.
Figure 6:
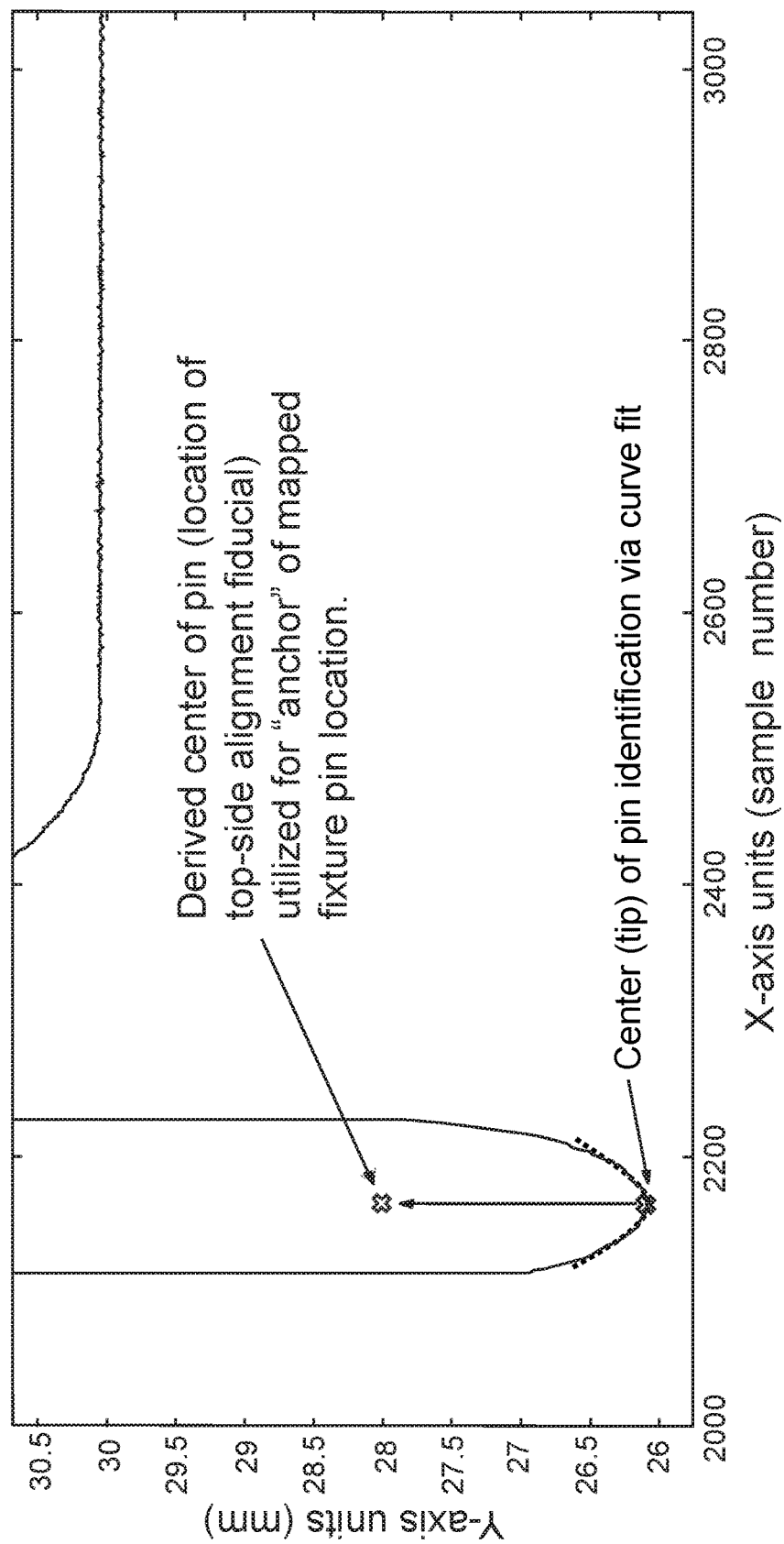
FIG. 6 is an enlarged graphical depiction of an exemplary portion of the side scan data of FIG. 5, showing a relationship between the side scan data and a fiducial on a top surface of an alignment feature.

In some embodiments, a side view of one or more of the edge segments 23 of the workpiece 22, a side view of one or more of the feature edges 86 of the alignment features 60, and a top view of one or more of the top feature surfaces 80 are obtained. In some embodiments, a side scan may be employed to obtain side scan data that includes: workpiece edge profile data that is associated with characteristics of the workpiece edge; and side position data that is associated with relative side positions of the feature edges 86 as obtained from a side view. In some embodiments, a top scan may be employed to obtain top scan data that includes feature top position data associated with the top feature surfaces 80. FIG. 5 is a graphical depiction of exemplary side scan data, showing relative positions of two exemplary alignment features 60 and corners of workpiece edge segments 23. FIG. 6 is an enlarged graphical depiction of an exemplary portion of the side scan data of FIG. 5, showing a relationship between the side scan data and a top fiducial 84 on the top surface 80 of an alignment feature 60.

The top and side scans may be performed in any order. In some embodiments, the side scan is performed before the top scan. In some embodiments, the top scan is performed before the side scan. In some embodiments, top scans or side scans can be performed more than once and in any order. In some embodiments, the top and side scans can be performed simultaneously. In most embodiments, the workpiece 10 is maintained in a stationary position with respect to the support fixture 36 throughout the top and side scans and throughout the machining process. The support fixture 36 may, however, be stationary or in motion during the scans.

In some embodiments, the side scan is performed by one or more side scan sensors, such as one or more displacement sensors, such as an interferometer. In some embodiments, the top scan is performed by one or more top scan sensors, such as one or more cameras.

Figure 5A:
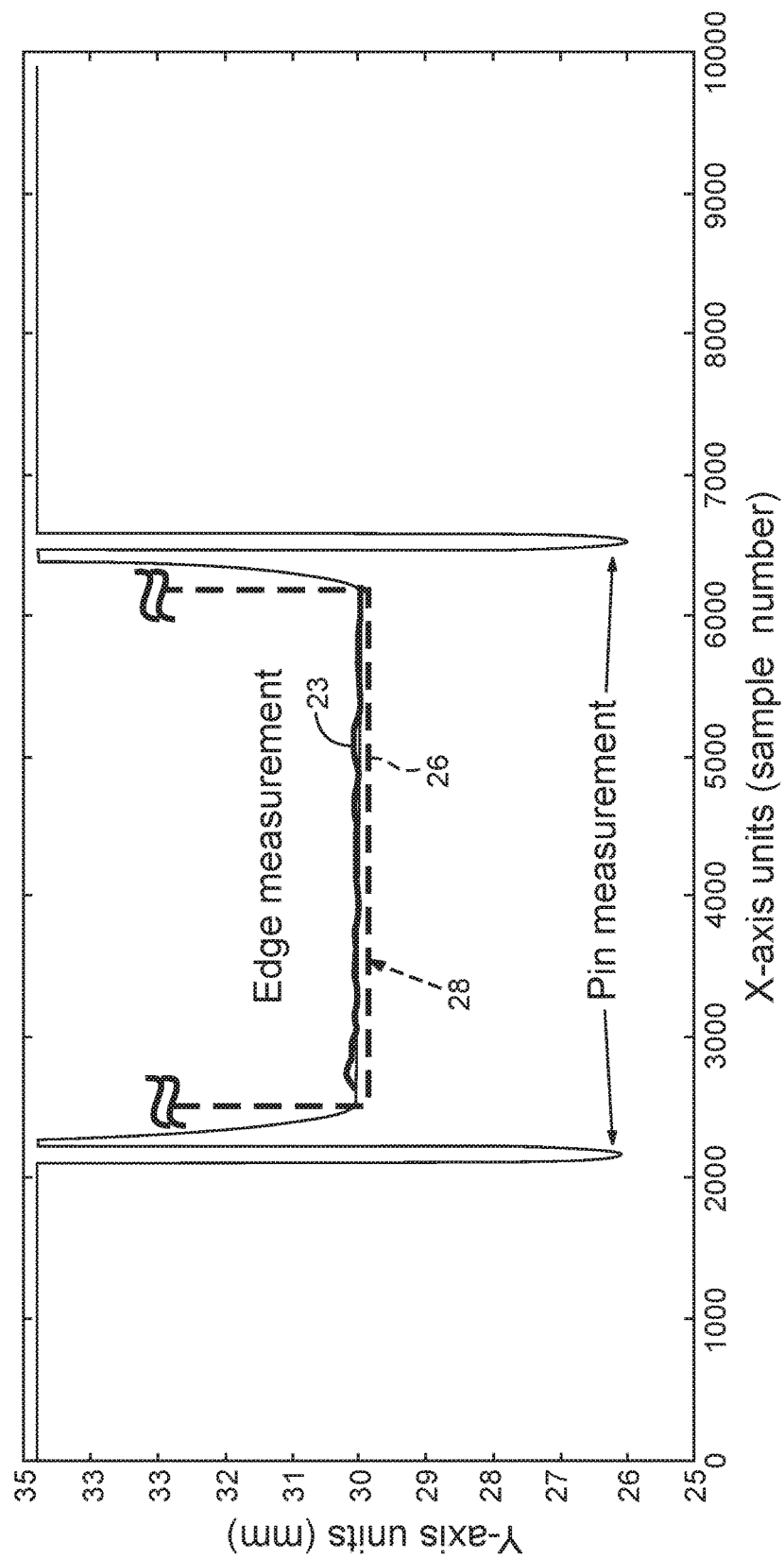
FIG. 5A is a graphical depiction of exemplary side scan data, showing deviations in a workpiece edge segment from an ideal workpiece edge segment.

In some embodiments, the side scan may include multiple side segment scans, wherein each side segment scan traverses along a vector defined by at least two of the alignment features 60, capturing the relative distance of the alignment features 60 to the corners or ends of the edge segments 23 of the workpiece 10. In some embodiments, one or more of the side segment scans is orthogonal (normal) to the scanning vector. In some embodiments, each of the side segment scans is orthogonal (normal) to the scanning vector. In some embodiments, the side segment scans include measurements of the alignment features 60 with some scan data collected beyond the alignment features 60 on at each extreme of the vector so as to provide a mechanism that the precise location of the alignment feature can be determined. FIG. 5 graphically depicts one embodiment of this method. FIG. 5A is a graphical depiction of exemplary side scan data, showing deviations in a workpiece edge segment 23 from an ideal workpiece edge segment 27.

In some embodiments, the scanning data is received in such a way that the pitch between each measurement sample can be determined. This objective can be accomplished in a number of ways. In some embodiments, the side scan sensor output data can be synchronized with the linear position of the side scan sensor as it scans the workpiece edge 22 by use of a linear or positional encoder.

In some embodiments, the workpiece edge 22 can be scanned at a constant velocity with the predication that the sampling rate of the side scan sensor is known and fixed or static. With this information a distance per workpiece edge segment 23 can be calculated (sample pitch). In some embodiments, the constant velocity is maintained within 5% of a predetermined velocity.

In some embodiments, the workpiece edge 22 can be scanned at a constant velocity and a per-sample pitch can be calculated by utilizing the known distance between the two alignment features 60 that are visible in each edge measurement. In some of such embodiments, the sensor-sampling rate does not need to be known, as long as the sampling rate is fixed or static and of sufficient frequency to provide the resolution desired to identify the "centers" of the alignment features 60 within the data.

An exemplary system including a side scan module is being introduced by Electro Scientific Industries, Inc. of Portland, Oreg. as a Model 6232 system. In some embodiments, the side scan sensors of the side scan module employ Model SICK OD2-P30W04 sensors, manufactured by SICK AG of Waldkirch, Germany.

In some embodiments, the top scan sensor is employed to obtain top scan data to map the locations of the alignment features 60 relative to each other from a top view. One objective for the top scan data is to provide a scale and alignment reference for the alignment features 60 detected by both the side scan(s) and the top scan(s). In some embodiments, the top scan sensor is distinct from the top scan sensor employed by the machining system to make the cut(s) in the cover material 30. An advantage of having a top scanning module that is distinct from one used by the laser machining system is that one workpiece 10 can be scanned while another workpiece 10 is being machined. In some such embodiments, the ideal perimeter profile may be employed by both top scanning systems (the machining system and the separate top scanning module) as well as the side scanning system. Such tandem scanning and machining may permit nearly double the overall throughput by significantly reducing the total processing time dedicated to each workpiece 10. However, in some embodiments, the top scan sensor can be the top scan sensor employed by the machining system, such as the scanning system employed by the Model 5390 laser micromachining, manufactured by Electro Scientific Industries, Inc. of Portland Oreg. An advantage of using the same top scan sensor for both the mapping of the top surfaces of the alignment features 60 and for aligning the machining system is that such implementation can reduce the cost of the scanning equipment and reducing the travel and settling time of the support fixtures 36.

In some embodiments, the top scan data singular to each individual alignment feature 60 is then utilized by the measurement system to accurately transform the measurement data into the coordinate frame used by the machining system, and a cutting part profile relative to the machining coordinate frame is determined.

As noted previously, in some embodiments, the top surfaces 80 of the alignment features 60 are of a known length, with the top surface 80 having a centered alignment fiducial 84, precisely in the middle of the feature top surface 80, visible to the top scanning system (of the machining system). Either the fiducial 84, the full top surface 80 of the alignment feature 60 (such as a flat circle for a cylindrical alignment feature 60), or both may be utilized for identification by the top scanning system.

In most embodiments previously discussed, it is desirable to find the center of the alignment features 60 from the scanned measurement data. In some embodiments, this determination can be accomplished by a fitting algorithm to find the low/high point of the curve that represents the "inflection point" of the alignment feature 60. FIG. 6 graphically depicts one embodiment of how this determination can be accomplished.

In some embodiments, the determined location of the alignment features 60 within the measurement data can be used as "anchors" to transform the entirety of each side segment scan into an accurate, but temporary, two-dimensional side scan coordinate frame. In some embodiments, this transformation can be accomplished by considering the center "inside" the found alignment feature 60 (such as a point exactly one radius inside a cylinder) as identical to the associated fixture mapped location. This transformation can be done for all (four) sides 42 (edge segments 23) of the workpiece 10.

Figure 5B:
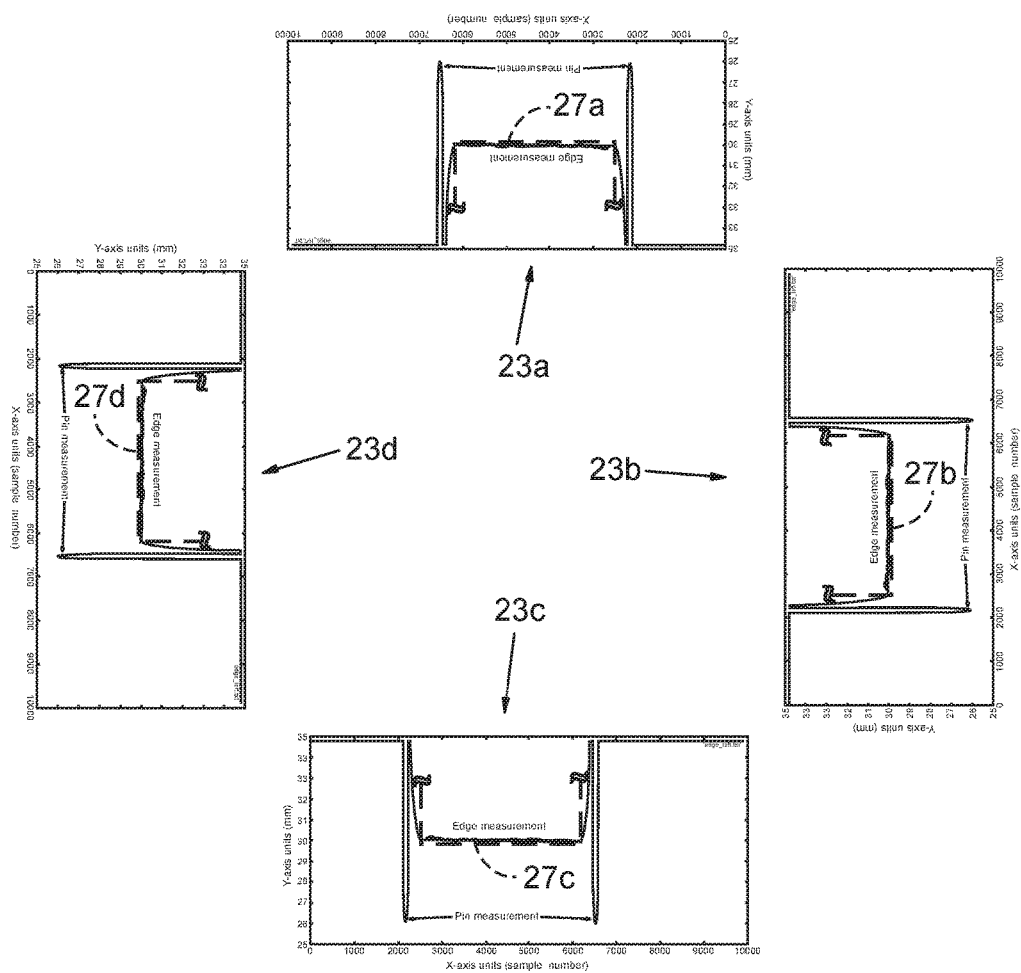
FIG. 5B is a graphical depiction of exemplary side scan data from four sides of a workpiece, with the side scan data of the edge segments oriented with respect to the workpiece perimeter.

In some embodiments, it is then desirable to "overlay" or "assemble" the (four) independent side data measurements together using the determined locations of the alignment features 60 as anchors. For example, if exemplary left side data is considered, it contains measurements for the lower left and upper left alignment features 60 while the bottom side contains the lower left and lower right alignment features 60 within its measurement data. The lower left "anchors" from the left and bottom sides' two-dimensional coordinate frames can be matched. This matching can be accomplished for all alignment points utilizing all (four) measurement 2-D datasets. For the resulting match ups to present a correct representation of the workpiece 10 relative to the alignment features 60, in some embodiments it may be preferable to have only one true orientation of these datasets and that the true orientation "face" upwards (relative to the top surfaces 80 of the alignment features 60/alignment fiducials 84 visible by the top scanning system). FIG. 5B is a graphical depiction of exemplary side scan data from four sides of a workpiece 10, with the side scan data of the edge segments 23 oriented with respect to the workpiece perimeter profile 24.

Figure 6A:
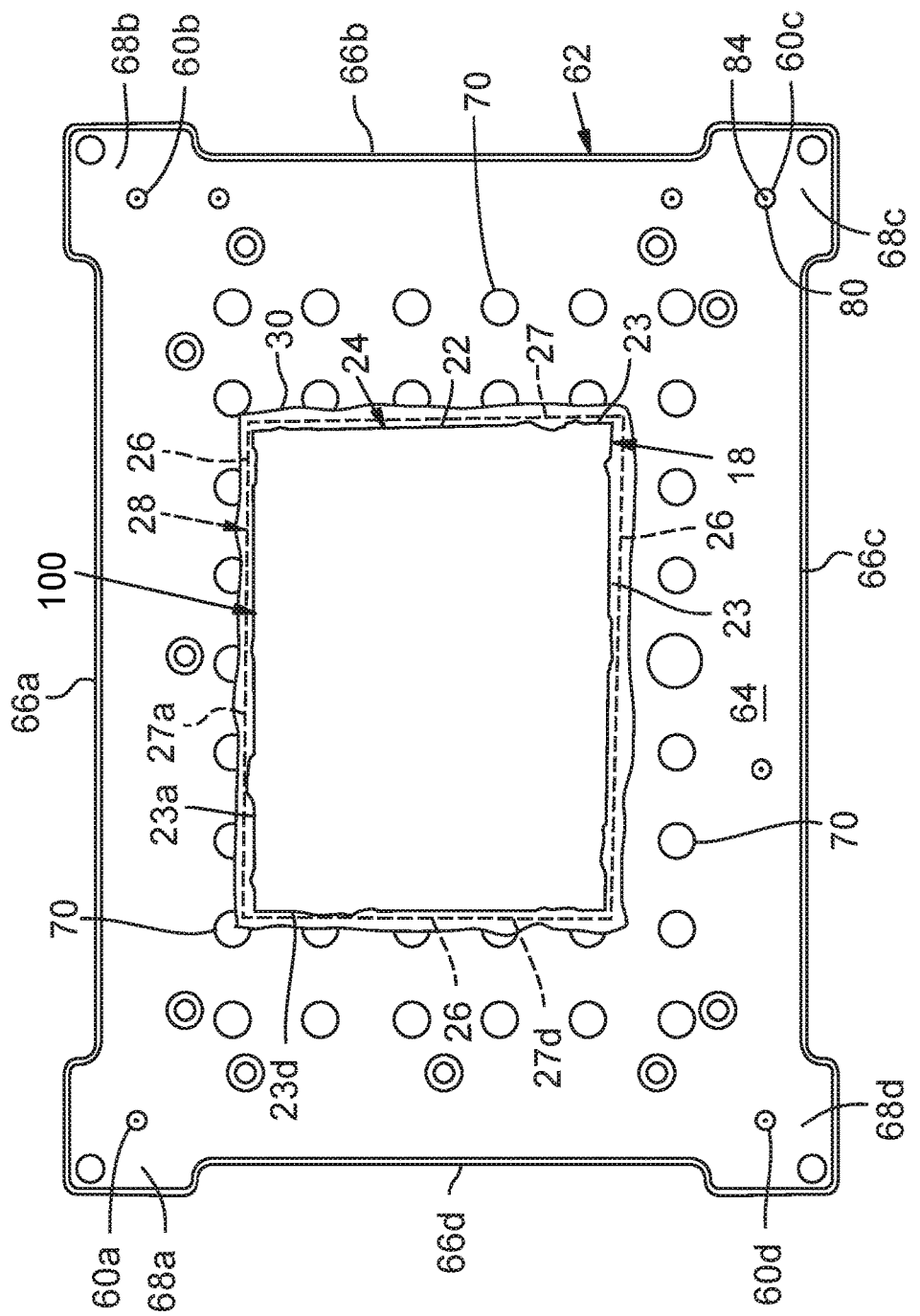
FIG. 6A is a top plan view of an exemplary embodiment of the support fixture showing a tool path overlying an oversized layer of cover material on a workpiece.

With the anchor matched and the data concerning the edge segments assembled to include a complete workpiece perimeter profile 24, a tooling route, trajectory, or tool path can be determined that accurately represents the workpiece edge 22 within the support fixture 36 as it is relative to the alignment features 60. The tool path is then provided to the machining system, such as through file transfer protocol (FTP). In some embodiments, it may be desirable for the machining system to align (or re-align) to the alignment features 60 so as to compensate for fixture offset, rotation, and possible scaling due to temperature fluctuations between when the workpiece edge 22 and alignment features 60 were measured and when the machining is performed. The cover top surface 44 of the cover material 30 can then be machined by the machining system using the individually customized tool path 100 that matches the workpiece perimeter profile 24 of the workpiece edge 22. FIG. 6A is a top plan view of an exemplary embodiment of the support fixture 36 showing a tool path 100 overlying an oversized layer of cover material 30 on a workpiece 10.

It will be appreciated that obstructions such as fixture pins 74 or other obstructions or incomplete data (or data that exceeds the measurement range of the scanner and "rails") may create "gaps" in the (side scan) data. The manner in which bridging the data gaps is accomplished may vary depending upon the workpiece 10 to be machined, and may be unnecessary for many embodiments. In one exemplary implementation, an ideal workpiece perimeter profile 28/tool path for the workpiece 10 to be measured/processed (also known as a "ghost" tool path) can be utilized. Gap bridging can be enabled by referencing the ideal workpiece perimeter profile 28 where data is missing from the side scan data and by splicing in the ideal trajectory for the missing data. In some embodiments, gap bridging can also be accomplished by simply interpolating between the last known good measurement data points. In some embodiments, these obstructions are known in advance and can be masked (intentionally ignored) by the scanning system. Some filtering of the measurement data may also be desirable so as to eliminate outliers and/or compensate for noisy measurement data.

Figure 7:
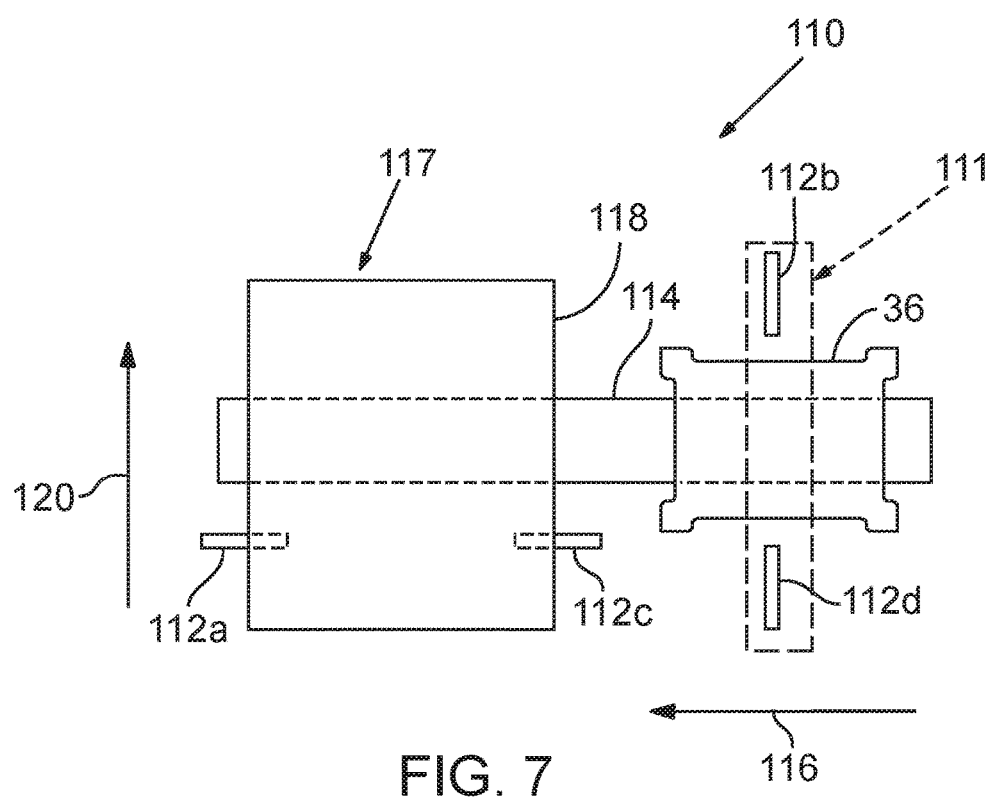
FIG. 7 is a top plan view of a simplified exemplary side scanning system.

FIG. 7 is a top plan view of a simplified exemplary side scanning system 110 that includes one or more side displacement sensors 112, such as side displacement sensors 112a, 112b, 112c, and 112d to obtain side scan data of the workpiece edge segments 23 and alignment features 60. With reference to FIG. 7, in some embodiments, the workpiece 10 can be loaded or positioned onto the support fixture 36 before or after the support fixture 36 is loaded on a transport mechanism such as a chuck, conveyor, or fixture rail 114. The workpiece 10 is secured in place, such as by applying vacuum pressure to the workpiece 10 through holes 70 in the support fixture 36, as previously discussed.

In some embodiments, the support fixture 36 can be moved between stationary side displacement sensors 112, the side displacement sensors can move along the one or more of the workpiece edge segments 23, or both the support fixture 36 and the side displacement sensors 112 can be in relative motion (in which case it would be preferable for the relative motion be at known constant relative motion for some embodiments). Stationary registration between the workpiece 10 and the support fixture 36 is preferably maintained during the scanning procedure.

With reference again to FIG. 7, in some embodiments, a stationary side sensor module 111, includes a pair of displacement sensors 112b and 112d that are positioned to be opposing, stationary, and directed toward workpiece edge segments 23b and 23d, respectively, and spaced sufficiently far apart to permit travel of the workpiece 10 or the support fixture 36 between them. The support fixture 36 is then moved by the fixture rail 114 (or chuck) so that the entire length of the edge segments 23b and 23d travel along a workpiece travel direction 116 through the scanning field of the respective side displacement sensors 112b and 112d. The side displacement sensors 112b and 112d can therefore obtain side scan data of both workpiece edge segments 23b and 23d simultaneously. It will be appreciated that a sensor viewing axis that is perpendicular to the fixture edge segment 66a may be preferred for some embodiments; however, the side displacement sensors 112 may be positioned so that their viewing axes are not perpendicular. Moreover, the side displacement sensors 112b and 112d may preferably positioned along the same axis in some embodiments; however, their viewing axes need not be aligned. Furthermore, the side displacement sensors 112b and 112d may be moved while the support fixture 36 is moved.

With continued reference to FIG. 7, in some embodiments, the support fixture 36 may be moved to or loaded into a mobile side sensor module 117 that includes a side sensor stage 118 that supports a pair of displacement sensors 112a and 112c that are positioned to be opposing, stationary, and directed toward workpiece edge segments 23a and 23c, respectively, and spaced sufficiently far apart to permit travel of the workpiece 10 or the support fixture 36 between them. Stationary registration between the workpiece 10 and the support fixture 36 is preferably maintained during the side scan by the stationary side scan module 111, transport to the mobile side sensor module 117, and during the scan conducted by the mobile side sensor module 117.

In some embodiments, the side displacement sensors 112a and 112c have a transverse and preferably orthogonal orientation to the orientation of the side displacement sensors 112*b* and 112*d*, particularly if the orientation of the support fixture 36 is not changed between the stationary side sensor module 111 and the mobile side sensor module 117. However, in some alternative embodiments, the orientation of the support fixture 36 can be changed such as on a turn table (such as in place of the mobile side sensor module 117), and the support fixture 36 can be run back through the stationary side sensor module 111 to obtain side scan data for workpiece edge segments 23*a* and 23*c*. It is also noted that side scan sensors 112, can be stationary positioned around a turn table to obtain side scan data of all edge segments 23 during rotation of the support fixture 36, or the side scan sensors 112 can be mounted about a platform such that they spin around a stationary support fixture 36.

The side displacement sensors 112*a* and 112*c* can be identical to each and to the side displacement sensors 112*b* and 112*d*, or the side displacement sensors 112*a* and 112*c* can be of different types from that of each other or from those of the side displacement sensors 112*b* and 112*d*.

With reference again to the mobile side sensor module 117 in FIG. 7, the side sensor stage 118 may move the side displacement sensors 112*a* and 112*c* in a sensor direction of travel 120 while the support fixture 36 is stationary to obtain the side sensor data for workpiece edge segments 23*a* and 23*c*. After all of the workpiece edge segments 23 have been scanned by the side displacement sensors 112, the support fixture can be transported to the machining system, such as the laser system shown in FIG. 8, while stationary registration between the workpiece 10 and the support fixture 36 is preferably maintained.

Figure 8:
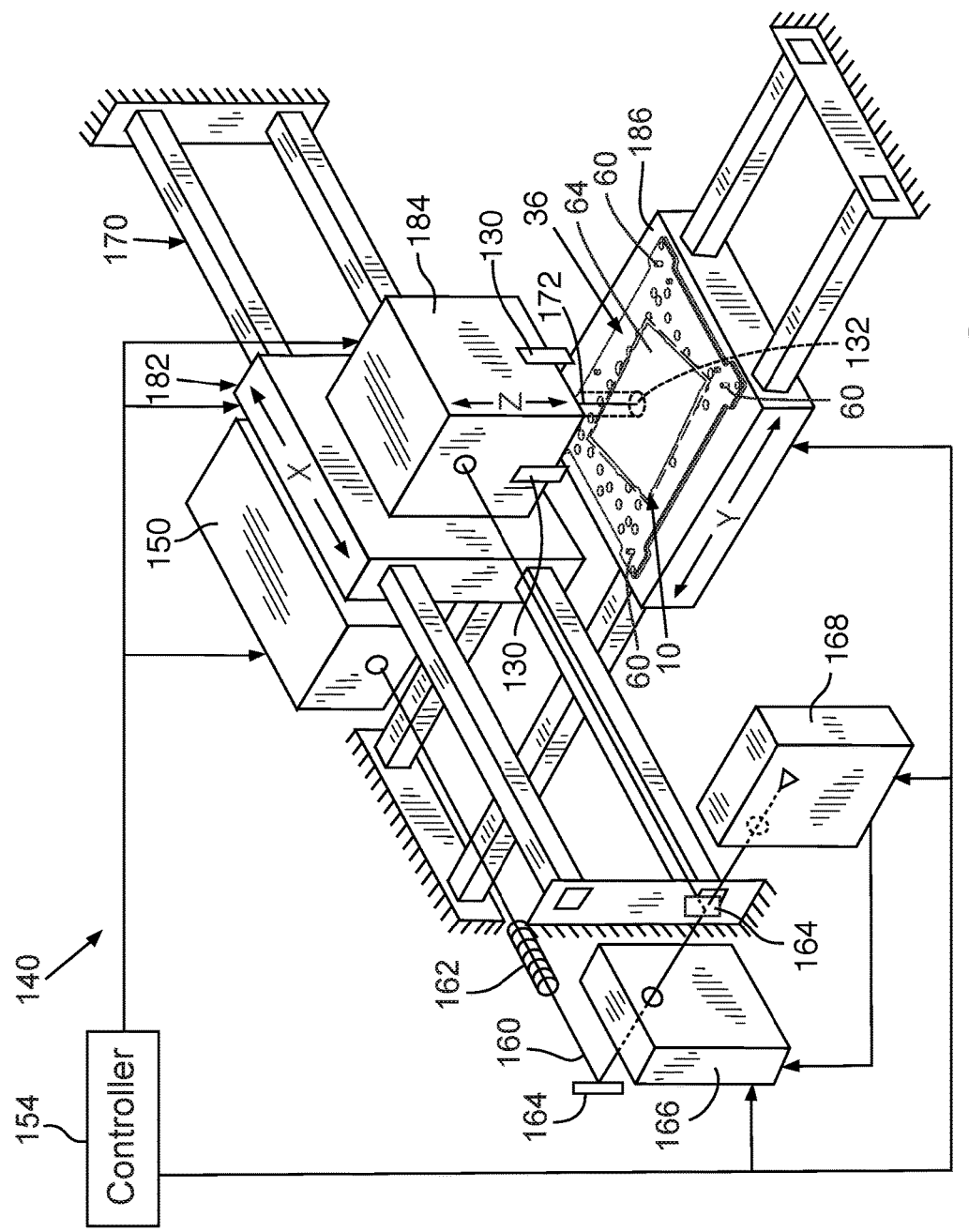
FIG. 8 is a view of an exemplary tool, such as a laser system, employed to machine the workpiece, such as by making a cut.

FIG. 8 is simplified and partly schematic perspective view of some components of an exemplary machining system, such as laser micromachining system 140 suitable for machining the workpiece 10, such as by making a cut in the cover material 30 on the workpiece 10. With reference to FIG. 8, lasers have been employed to machine or cut workpieces 10, such as wafers or other semiconductor industry material substrates 12 or cover materials 30. Exemplary cover, materials 30 may include opaque or nontransparent ceramics, glasses, plastics, polycarbonates, acrylics, and metals, or combinations thereof. Exemplary materials may be crystalline or noncrystalline. Exemplary materials may be natural or synthetic.

Exemplary laser pulse parameters that may be selected to improve the reliability and repeatability of laser machining of the cover material 30 include laser type, wavelength, pulse duration, pulse repetition rate, velocity of beam axis movement (beam velocity), number of pulses, pulse energy, pulse temporal shape, pulse spatial shape, and focal spot size and shape. Additional laser pulse parameters include specifying the location of the focal spot relative to the top surface 44 of the cover material 30 and directing the relative motion of the laser pulses with respect to the workpiece 10.

With reference again to FIG. 8, some exemplary laser processing systems 140 operable for machining spots 132 on or beneath the top surface 44 of the cover material 30 of the workpiece 10 are the ESI MM5330 micromachining system, the ESI MM5335 micromachining system, the ESI ML5900 micromachining system and the ESI 5950 micromachining system, all manufactured by Electro Scientific Industries, Inc., Portland, Oreg. 97229.

These systems 140 typically employ a laser 150, such as a $CO_2$ laser. However, these systems may be adapted by the substitution or addition of appropriate laser, laser optics, parts handling equipment, and control software to reliably and repeatably cut the cover material 30. These modifications permit the laser micromachining system 140 to direct laser pulses with the appropriate laser parameters to the desired locations on an appropriately positioned and held workpiece 10 at the desired rate and pitch between laser spots or pulses to create the desired spot 132.

In some embodiments, a solid-state diode-pumped laser, which can be configured to emit wavelengths from about 266 nm (Ultraviolet (UV)) to about 1320 nm (infrared (IR)) at pulse repetition rates up to 50 MHz or even greater. In some embodiments, the laser micromachining system 140 employs a diode-pumped Nd:YVO4 solid-state laser 150 operating at 1064 nm wavelength, such as a model Rapid manufactured by Lumera Laser GmbH, Kaiserslautern, Germany. This laser 150 can be optionally frequency doubled using a solid-state harmonic frequency generator to reduce the wavelength to 532 nm thereby creating visible (green) laser pulses, or frequency tripled to about 355 nm or frequency quadrupled to about 266 nm thereby creating ultraviolet (UV) laser pulses. This laser 150 is rated to produce 6 Watts of continuous power and has a maximum pulse repetition rate of 1000 KHz. This laser 150 produces laser pulses 1 with duration of 1 picosecond to 1,000 nanoseconds in cooperation with controller 154.

In some embodiments, the laser micromachining system 140 employs a diode-pumped erbium-doped fiber laser with a fundamental wavelength within the range of about 1030-1550 nm. These lasers can be optionally frequency doubled using a solid-state harmonic frequency generator to reduce the wavelength to about 515 nm thereby creating visible (green) laser pulses or to about 775 nm thereby creating visible (dark red) laser pulses, for example, or frequency tripled to about 343 nm or about 517 nm, or frequency quadrupled to about 257 nm or about 387.5 nm thereby creating ultraviolet (UV) laser pulses. More generally, in some embodiments, the laser wavelength comprises a wavelength between 200 nm and 3000 nm.

These laser pulses may be Gaussian or specially shaped or tailored by the laser optics 162, typically comprising one or more optical components positioned along an optical path 160, to permit desired characteristics of the spots 132. For example, a "top hat" spatial profile may be used which delivers a laser pulse having an even dose of radiation over the entire spot 132 that impinges the cover material 30. Specially shaped spatial profiles such as this may be created using diffractive optical elements or other beam-shaping components. A detailed description of modifying the spatial irradiance profile of laser spots 132 can be found in U.S. Pat. No. 6,433,301 of Corey Dunsky et al., which is assigned to the assignee of this application, and which is incorporated herein by reference.

The laser pulses are propagated along an optical path 160 that may also include fold mirrors 164, attenuators or pulse pickers (such as acousto-optic or electro-optic devices) 166, and feedback sensors (such as for energy, timing, or position) 168. The laser optics 162 and other components along the optical path 160, in cooperation with a laser beam-positioning system 170 directed by the controller 154, direct a beam axis 172 of the laser pulse propagating along the optical path 160 to form a laser focal spot in proximity to the top surface 44 of the cover material 30 at a desired laser spot position.

The laser machining system 140 may include one or more top scan sensors, such as cameras 130 to align the beam axis 172 to the workpiece 10 or the alignment feature 60 of the support fixture 36 so that the laser spot 132 can be directed along a desired tool path with respect to the workpiece 10. The camera 130 may also be used to obtain the top scan data concerning the alignment features 60, as previously discussed. In some embodiments in which the camera 130 is also used to perform the mapping of the top surfaces 80 of the alignment features 60, auto-scaling settings of the machining may be turned off because the alignment features 60 provide the scaling data. The camera 130 may be offset from, but calibrated with, the beam axis 172. However, in some embodiments, the camera 132 may share the beam axis 172.

The laser beam-positioning system 170 may include a laser stage 182 that is operable to move the laser 150 along an axis of travel, such as the X-axis, and a fast-positioner stage 184 to move a fast positioner (not shown) along an axis of travel, such as the Z-axis. A typical fast positioner employs a pair of galvanometer-controlled mirrors capable of quickly changing the direction of the beam axis 172 over a large field on the cover material 30. Such field is typically smaller than the field of movement provided by the workpiece stage 186, which provides movement of the workpiece 10 along one or more axes, such as the Y axis and/or the X axis.

An acousto-optic device or a deformable mirror may also be used as the fast positioner, even though these devices tend to have smaller beam deflection ranges than galvanometer mirrors. Alternatively, an acousto-optic device or a deformable mirror may be used as a high-speed positioning device in addition to galvanometer mirrors.

Additionally, the support fixture 36 may be supported by a workpiece stage 186 having motion control elements operable to position the alignment features 60 of the support fixture 36 with respect to the beam axis 172. The workpiece stage 186 may be operable to travel along a single axis, such as the Y-axis, or the workpiece stage 186 may be operable to travel along transverse axes, such as the X- and Y-axes. Alternatively, the workpiece stage 86 may be operable to rotate the workpiece 10 on the support fixture 36, such as about a Z-axis (solely, or as well as move the workpiece 10 on the support fixture 36 along the X- and Y-axes).

The controller 154 can coordinate operation of the laser beam-positioning system 70 and the workpiece stage 86 to provide compound beam-positioning capability, which facilitates the capability to cut the cover material 30 while the workpiece 10 can be in continuous relative motion to the beam axis 172. This capability is not necessary for machining the cover material 30, but this capability may be desirable for increased throughput. This capability is described in U.S. Pat. No. 5,751,585 of Donald R. Cutler et al., which is assigned to the assignee of this application, and which is incorporated herein by reference.

Additional or alternative methods of beam positioning can be employed. Some additional or alternative methods of beam positioning are described in U.S. Pat. No. 6,706,999 of Spencer Barrett et al. and U.S. Pat. No. 7,019,891 of Jay Johnson, both of which are assigned to the assignee of this application, and which are incorporated herein by reference. Laser parameters that may be advantageously employed for some embodiments include using lasers 150 with wavelengths that range from IR through UV, or particularly from about 3000 nm to about 200 nm, or more particularly from about 10.6 microns down to about 266 nm. The laser 50 may operate at 2 W, being in the range of 1 W to 100 W, or more preferably 1 W to 12 W. Pulse durations range from 1 picosecond to 1000 ns, or more preferably from about 1 picosecond to 200 ns. The laser repetition rate may be in a range from 1 KHz to 100 MHz, or more preferably from 10 KHz to 1 MHz. Laser fluence may range from about $0.1\times10^{-6}$ J/cm$^2$ to 100.0 J/cm$^2$ or more particularly from $1.0\times10^{-2}$ J/cm$^2$ to 10.0 J/cm$^2$. The speed with which the beam axis 172 moves with respect to the workpiece 10 ranges from 1 mm/s to 10 m/s, or more preferably from 100 mm/s to 1 m/s. The pitch or spacing between adjacent rows of spots 132 on the cover material 30 may range from 1 micron to 1000 microns or more preferably from 10 microns to 100 microns. The major spatial axis of the beam waist of the laser pulses measured at the focal point of the laser beam may range from 10 microns to 1000 microns or from 50 microns to 500 microns. In some embodiments, the beam waist of the focal point is between 1 micron and 50 microns. In some embodiments, the beam waist of the focal point is between 1 micron and 25 microns. In some embodiments, the beam waist of the focal point is between 1 micron and 5 microns.

The use of picosecond lasers, which produce laser pulsewidths in the range from 1 to 1,000 picoseconds, provided a good way to reliably and repeatably make cuts within some semiconductor substrates. In some embodiments, pulsewidths in a range from 1 to 100 ps can be employed. In some embodiments, pulsewidths in a range from 5 to 75 ps can be employed. In some embodiments, pulsewidths in a range from 10 to 50 ps can be employed. It is speculated that femtosecond laser, producing pulsewidths in the 1- to 1000-femtosecond (fs) range, could alternatively provide good results. Alternatively, pulseswidths in a range from 1 fs to 500 nanoseconds (ns) can be employed. In some embodiments, pulsewidths in a range from 500 fs to 10 ns can be employed. An advantage of using picosecond lasers, however, is that they are much less expensive, require much less maintenance, and typically have much longer operating lifetimes than existing femtosecond lasers. Nevertheless, femtosecond lasers may be preferred in some instances despite their greater costs.

Many of the stitch-cutting and other techniques and parameters, such as those disclosed in U.S. Reissue Pat. No. RE 43,605 of O'Brien et al., can be adopted for cutting the cover material 30 in accordance with this disclosure. U.S. Reissue Pat. No. RE 43,605 is assigned to the assignee of this application, and is incorporated herein by reference.

The foregoing is illustrative of embodiments of the invention and is not to be construed as limiting thereof. Although a few specific example embodiments have been described, those skilled in the art will readily appreciate that many modifications to the disclosed exemplary embodiments, as well as other embodiments, are possible without materially departing from the novel teachings and advantages of the invention.

Accordingly, all such modifications are intended to be included within the scope of the invention as defined in the claims. For example, skilled persons will appreciate that the subject matter of any sentence or paragraph can be combined with subject matter of some or all of the other sentences or paragraphs, except where such combinations are mutually exclusive.

It will be obvious to those having skill in the art that many changes may be made to the details of the above-described embodiments without departing from the underlying principles of the invention. The scope of the present invention should, therefore, be determined by the following claims, with equivalents of the claims to be included therein.

The invention claimed is:

1. A method for determining a customized tool path for machining a cover material to fit a workpiece, wherein the workpiece has a workpiece top surface, wherein the workpiece has a workpiece bottom surface, wherein the workpiece has a workpiece side between the workpiece top surface and the workpiece bottom surface, wherein the workpiece has a workpiece edge positioned along the workpiece side, wherein the cover material has a cover top surface, wherein the cover material has a cover bottom surface, wherein the cover material has a cover side between the cover top surface and the cover bottom surface, wherein the cover material has an initial cover edge positioned at the cover side, wherein the workpiece top surface supports the cover material such that the cover bottom surface is closer to the workpiece top surface and the cover top surface is farther from the workpiece top surface, and wherein the initial cover edge is unmatched to the workpiece edge, the method comprising:

securing the workpiece to a support fixture, wherein the workpiece is secured in a stationary position with respect to the support fixture, wherein the workpiece bottom surface is closer to the support fixture and the workpiece top surface is farther from the support fixture, wherein the support fixture includes a plurality of alignment features, including a first alignment feature and a second alignment feature, wherein the first alignment feature has a first feature top and a first feature side, and wherein the second alignment feature has a second feature top and a second feature side;

performing a side scan by scanning the workpiece side, the first feature side, the second feature side, to obtain side scan data, wherein the side scan data includes workpiece edge profile data that is associated with characteristics of the workpiece edge, wherein the side scan includes side position data that is associated with relative side positions of the first feature side and the second feature side; and performing, a top scan by scanning the first feature top and the second feature top to obtain top scan data, wherein the top scan data includes first feature top position data associated with the first feature top and second feature top position data associated with the second feature top; and determining a tool path, over the cover top surface of the cover material, that is associated with the workpiece edge, wherein the tool path is based on correlation of the side scan data with the top scan data.

2. The method of claim 1, further comprising:

relatively aligning a cutting tool axis of a machining tool to a location on the cover top surface along the tool path; and employing the machining tool to cut the cover top surface along the tool path associated with the workpiece edge to form a processed cover edge that matches the workpiece edge.

3. The method of claim 1, wherein the first and second alignment features are respective alignment pins.

4. The method of claim 1, wherein a laser is employed to cut the cover top surface along the tool path that is associated with the workpiece edge to form a processed cover edge that matches the workpiece edge.

5. The method of claim 1, wherein the workpiece edge forms a workpiece perimeter, wherein the initial cover edge forms an initial cover edge perimeter, and wherein the processed cover edge forms a processed cover perimeter.

6. The method of claim 5, wherein the workpiece is loaded into a random position with respect to the support fixture, and wherein the first alignment feature and the second alignment feature are external to the workpiece perimeter.

7. The method of claim 5, wherein the step of scanning comprises scanning the entire workpiece perimeter.

8. The method of claim 1, wherein the workpiece edge includes a plurality of transverse workpiece edge segments, and wherein the initial cover edge includes a plurality of transverse initial cover edge segments.

9. The method of claim 8, wherein a sufficient number of additional alignment features are employed such that each workpiece edge segment fits between two alignment features.

10. The method of claim 1, wherein the support fixture has a major surface dimension greater than that of the workpiece.

11. The method of claim 10, wherein the support fixture has a fixture surface area that prevents employment of a machining axis having perpendicular intersection with the cover bottom surface along the workpiece edge.

12. The method of claim 1, wherein a predetermined feature separation distance is employed to scale the relative side positions of the first feature side and the second feature side.

13. The method of claim 1, wherein the side scan data is obtained by one or more displacement sensors.

14. The method of claim 1, wherein the first alignment feature and the second alignment feature are positioned along a feature line, and wherein the workpiece edge is positioned nonparallel to the feature line.

15. The method of claim 1, wherein any cover portion of the processed cover edge is within 50 microns of a respective nearest workpiece portion of the workpiece edge.

16. The method of claim 1, wherein the cover material comprises an optically opaque material.

17. The method of claim 1, wherein the top surface of the cover material is devoid of alignment features.

18. The method of claim 1, wherein the first alignment feature has a first feature top surface including a first alignment fiducial, wherein the second alignment feature has a second feature top surface including a second alignment fiducial, and wherein the first and second alignment fiducials have fiducial major dimensions that are smaller than respective alignment feature major dimensions.

19. The method of claim 1, wherein the characteristics of the edge profile data include the distance between a side scan sensor and each of a multiplicity of points along the workpiece side as each of the points passes through a side sensor axis of the side sensor.

20. The method of claim 1, wherein the side scan is performed by a side scan sensor, wherein the top scan is performed by a top scan sensor, and wherein the side scan sensor and the top scan sensor are different types of sensors.

21. The method of claim 1, wherein side scan data acquisition is synchronized with relative position between a scan sensor and locations along the workpiece side by use of a linear or positional encoder.

22. The method of claim 1, wherein side scan data acquisition employs a predetermined sampling rate synchronized with a substantially constant velocity of relative movement between a scan sensor and locations along the workpiece side.

23. The method of claim 1, wherein side scan data acquisition utilizes a known distance between the first alignment feature and the second alignment feature and employs a substantially constant velocity of relative movement between a scan sensor and locations along the workpiece side.

24. The method of claim 23, wherein the substantially constant velocity is maintained within 5% of a predetermined velocity.

25. The method of claim 1, wherein the side scan occurs in a side scan field, and wherein the tool path is implemented in a machining field that is discrete from the side scan field.

26. The method of claim 1, wherein a first workpiece edge segment is positioned between axes defined by the first and second alignment features, wherein a second workpiece edge segment is positioned between axes defined by the second alignment feature and a third alignment feature, and wherein data associated with the second alignment feature is used to provide a continuous tool path along the first workpiece edge and the second workpiece edge.

27. A method for determining a customized tool path for machining a cover material to fit a workpiece, wherein the workpiece has a workpiece top surface, wherein the workpiece has a workpiece bottom surface, wherein the workpiece has a workpiece side between the workpiece top surface and the workpiece bottom surface, wherein the workpiece has a workpiece edge positioned along the workpiece side, wherein the cover material has a cover top surface, wherein the cover material has a cover bottom surface, wherein the cover material has a cover side between the cover top surface and the cover bottom surface, wherein the cover material has an initial cover edge positioned at the cover side, wherein the workpiece top surface supports the cover material such that the cover bottom surface is closer to the workpiece top surface and the cover top surface is farther from the workpiece top surface, and wherein the initial cover edge is unmatched to the workpiece edge, the method comprising:

securing the workpiece to a support fixture, wherein the workpiece is secured in a stationary position with respect to the support fixture, wherein the workpiece support fixture has a fixture location calibrated with respect to a coordinate system for a machining tool, wherein the workpiece bottom surface is closer to the support fixture and the workpiece top surface is farther from the support fixture, wherein the support fixture is associated with a plurality of alignment features, including a first alignment feature and a second alignment feature, wherein the first alignment feature has a first feature side dimension, and wherein the second alignment feature has a second feature side dimension;

scanning the workpiece side, the first feature side, and the second feature side, wherein a side scan is employed to obtain side scan data, wherein the side scan data includes workpiece edge profile data that is associated with characteristics of the workpiece edge, wherein the side scan includes side position data that is associated with relative side positions of the first feature side and the second feature side;

determining a tool path, over the cover top surface of the cover material, that is associated with the workpiece edge, wherein the tool path is based on correlation of the side scan data with the fixture location calibrated with respect to the coordinate system for the machining tool;

relatively aligning a cutting tool axis of a machining tool to a location on the cover top surface along the tool path; and employing the machining tool to cut the cover top surface along the tool path associated with the workpiece edge to form a processed cover edge that matches the workpiece edge.

28. A system comprising:

a support fixture including a substrate support area and alignment fixtures, wherein the substrate is supportable within a substrate support area and wherein the alignment features are outside the substrate support area and include first and second spaced-apart alignment features, wherein each alignment feature has a feature top and a feature side, wherein the feature top has a discernable top characteristic, and wherein the feature side has a discernable side characteristic;

a first inspection system operable for inspecting the feature top of the alignment features to thereby acquire top scan data;

a second inspection system operable for inspecting the feature side of the alignment features to thereby acquire side scan data;

a relative movement system for causing relative movement between the support fixture and the first and second inspection systems;

a machining tool operable for machining the cover material; and one or more processors for coordinating relative movement between the support fixture and the first and second inspection systems, for correlating the side scan data with the top scan data, for determining a tool path for the machining tool over the top surface of the cover material, and for coordinating operation of the machining tool with relative movement between the workpiece and the machining tool along the tool path.

* * * * *